(12) United States Patent
O'Hara et al.

(10) Patent No.: US 8,988,765 B2
(45) Date of Patent: Mar. 24, 2015

(54) LASER PROJECTION SYSTEM WITH IMPROVED BIT DEPTH

(71) Applicant: Laser Light Engines, Inc., Salem, NH (US)

(72) Inventors: John O'Hara, Andover, MA (US); John Arntsen, Manchester-by-the-Sea, MA (US); Barret Lippey, Belmont, MA (US)

(*) Notice: Subject to any disclaimer, the term of this patent is extended or adjusted under 35 U.S.C. 154(b) by 213 days.

(21) Appl. No.: 13/892,341

(22) Filed: May 13, 2013

(65) Prior Publication Data

US 2013/0250401 A1    Sep. 26, 2013

Related U.S. Application Data

(63) Continuation-in-part of application No. 12/962,185, filed on Dec. 7, 2010, now Pat. No. 8,786,940.

(51) Int. Cl.
| | | |
|---|---|---|
| G02F 1/35 | (2006.01) | |
| H01S 3/10 | (2006.01) | |
| G02B 27/48 | (2006.01) | |
| H01S 3/23 | (2006.01) | |
| H01S 3/30 | (2006.01) | |
| H04N 9/31 | (2006.01) | |
| H01S 3/00 | (2006.01) | |

(52) U.S. Cl.
CPC ............... G02F 1/353 (2013.01); G02B 27/48 (2013.01); H01S 3/2383 (2013.01); H01S 3/302 (2013.01); H01S 3/005 (2013.01); H04N 9/3161 (2013.01); H01S 2301/02 (2013.01); H01S 3/2391 (2013.01)
USPC ................ 359/327; 359/328; 353/31; 372/21

(58) Field of Classification Search
None
See application file for complete search history.

(56) References Cited

U.S. PATENT DOCUMENTS

| | | | |
|---|---|---|---|
| 2003/0030756 A1* | 2/2003 | Kane et al. | 348/744 |
| 2010/0253769 A1* | 10/2010 | Coppeta et al. | 348/58 |
| 2010/0290009 A1* | 11/2010 | Chen et al. | 353/31 |

* cited by examiner

*Primary Examiner* — Hemang Sanghavi
(74) *Attorney, Agent, or Firm* — Barret Lippey

(57) ABSTRACT

An apparatus and method for despeckling that includes a green laser diode assembly, a pulsed laser with a repetition rate of less than 100 kHz, and stimulated Raman scattering light formed in an optical fiber. The laser diode light and stimulated Raman scattering light are combined to form a projected digital image. The green laser diode assembly or the pulsed laser is switched to improve the bit depth of the projected digital image.

20 Claims, 18 Drawing Sheets

Power in first fiber (%), color out of first fiber (GR %), and color out of second fiber (GR %) vs. total power (W)

LASER PROJECTION SYSTEM WITH IMPROVED BIT DEPTH

BACKGROUND OF THE INVENTION

There are many advantages for using laser light sources to illuminate digital projection systems, but the high coherence of laser light tends to produce undesirable speckle in the viewed image. Known despeckling methods generally fall into the categories of polarization diversity, angle diversion, and wavelength diversity. In the laser projection industry, there has been a long-felt need for more effective despeckling methods.

SUMMARY OF THE INVENTION

In general, in one aspect, an optical apparatus that includes a laser diode assembly that generates green laser light, a pulsed laser that generates green laser light; and an optical fiber. The pulsed laser has a pulse repetition rate of less than 100 kHz. The pulsed green laser light is focused into the optical fiber; the optical fiber generates stimulated Raman scattering light that enhances the light output from the optical fiber. The laser diode assembly green laser light and the stimulated Raman scattering light are combined to form a projected digital image. The laser diode assembly is switched to generate one bit of bit depth in the projected digital image.

Implementations may include one or more of the following features. The enhancement of the light output from the optical fiber may be related to color or speckle level. The pulsed green laser may have a wavelength of 532 or 523.5 nm. The pulsed green laser may be a diode pumped solid state laser with a pulse repetition rate of 25 kHz. A second pulsed green laser and second optical fiber may be included with the light from the second pulsed green laser focused into the second optical fiber. The second optical fiber may generate stimulated Raman scattering light that enhances its light output. The green diode assembly laser light, first stimulated Raman scattering light, and second stimulated Raman scattering light may be combined to form a projected digital image. The second pulsed green laser may be switched to generate one bit of bit depth. The brightness of the laser diode assembly may be equal to the brightness of the two pulsed green lasers. The combination of the laser diode assembly, the first pulsed laser and the second pulsed laser may achieve 10 bits of bit depth in the projected digital image. A third pulsed green laser and third optical fiber may be added. The third pulsed green laser may have a pulse repetition rate equal to approximately 50 kHz. The third pulsed green laser may be focused into the third optical fiber. The third optical fiber may generate stimulated Raman scattering light that enhances the light output of the third optical fiber. The green laser diode assembly, first stimulated Raman scattering light, second stimulated Raman scattering light, and third stimulated Raman scattering light may be combined to form a projected digital image. The green laser diode assembly brightness may be equal to the combined brightness of the three pulsed green lasers. The third pulsed laser may be switched to generate one bit of bit depth. The combination of the laser diode assembly and the three pulsed lasers may achieve 12 bits of bit depth in the projected digital image.

In general, in one aspect, an image projection method that includes generating a first green laser light from a green laser diode assembly, generating a second green laser light from a first pulsed laser that has a pulse repetition rate of less than 100 kHz, focusing the second green laser light into a first optical fiber, generating a first stimulated Raman scattering light in the first optical fiber, using the first stimulated Raman scattering light to enhance an aspect of the light output from the first optical fiber, combining the first green laser light and the first stimulated Raman scattering light to form a projected digital image, and switching the green laser diode assembly to generate one bit of bit depth in the projected digital image.

Implementations may include one or more of the following features. The aspect of the light output from the optical fiber may related to color or speckle level. The second green laser light may have a wavelength of 532 or 523.5 nm. The pulsed laser may include a diode pumped solid state laser. The pulse repetition rate may be equal to approximately 25 kHz. There may be additional steps of generating a third green laser light from a second pulsed laser, focusing the third green laser light into a second optical fiber, generating a second stimulated Raman scattering light in the second optical fiber, using the second stimulated Raman scattering light to enhance the light output of the second optical fiber, and combining the first green laser light, the first stimulated Raman scattering light, and the second stimulated Raman scattering light to form a projected digital image. The brightness of the first green laser light may be approximately equal to the brightness of the second green laser light plus the brightness of the third green laser light. The second pulsed laser may be switched to generate one bit of bit depth. The combination of the laser diode assembly, the first pulsed laser, and the second pulsed laser may achieve 10 bits of bit depth in the projected digital image. There may be additional steps of generating a fourth green laser light from a third pulsed laser, focusing the fourth green laser light into a third optical fiber, generating a third stimulated Raman scattering light in the third optical fiber, using the third stimulated Raman scattering light to enhance the light output of the third optical fiber, and combining the first green laser light, the first stimulated Raman scattering light, the second stimulated Raman scattering light, and the third stimulated Raman scattering light to form a projected digital image. The third pulsed laser may have a pulse repetition rate equal to approximately 50 kHz. The brightness of the first green laser light may be approximately equal to the brightness of the second green laser light plus the brightness of the third green laser light plus the brightness of the fourth green laser light. The third pulsed laser may be switched to generate one bit of bit depth. The combination of the laser diode assembly, the first pulsed laser, the second pulsed laser, and the third pulsed laser may achieve 12 bits of bit depth in the projected digital image.

DETAILED DESCRIPTION

Figure 1:
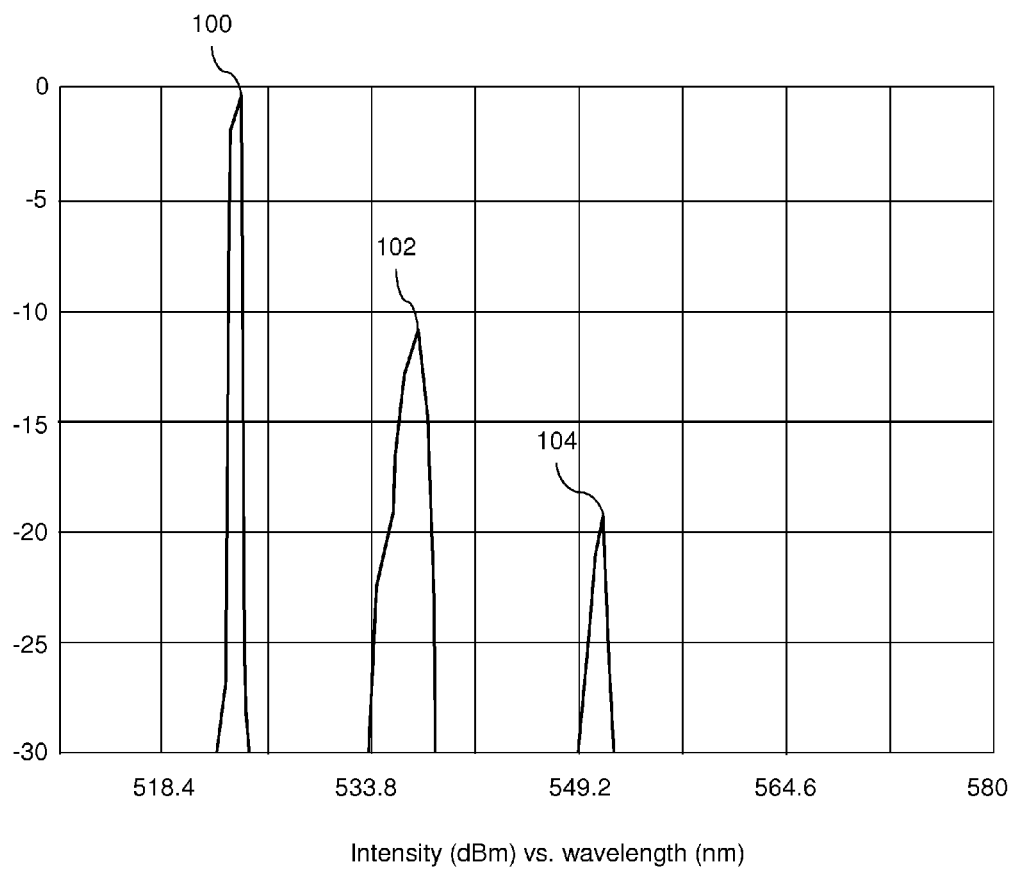
FIG. 1 is a graph of stimulated Raman scattering at moderate power.

Raman gas cells using stimulated Raman scattering (SRS) have been used to despeckle light for the projection of images as described in U.S. Pat. No. 5,274,494. SRS is a non-linear optical effect where photons are scattered by molecules to become lower frequency photons. A thorough explanation of SRS is found in Nonlinear Fiber Optics by Govind Agrawal, Academic Press, Third Edition, pages 298-354. FIG. 1 shows a graph of stimulated Raman scattering output from an optical fiber at a moderate power which is only slightly above the threshold to produce SRS. The x-axis represents wavelength in nanometers (nm) and the y-axis represents intensity on a logarithmic scale in dBm normalized to the highest peak. First peak 100 at 523.5 nm is light which is not Raman scattered. The spectral bandwidth of first peak 100 is approximately 0.1 nm although the resolution of the spectral measurement is 1 nm, so the width of first peak 100 cannot be resolved in FIG. 1. Second peak 102 at 536.5 nm is a peak shifted by SRS. Note the lower intensity of second peak 102 as compared to first peak 100. Second peak 102 also has a much larger bandwidth than first peak 100. The full-width half-maximum (FWHM) bandwidth of second peak 102 is approximately 2 nm as measured at points which are −3 dBm down from the maximum value. This represents a spectral broadening of approximately 20 times compared to first peak 100. Third peak 104 at 550 nm is still lower intensity than second peak 102. Peaks beyond third peak 104 are not seen at this level of power.

Nonlinear phenomenon in optical fibers can include self-phase modulation, stimulated Brillouin Scattering (SBS), four wave mixing, and SRS. The prediction of which nonlinear effects occur in a specific fiber with a specific laser is complicated and not amenable to mathematical modeling, especially for multimode fibers. SBS is usually predicted to start at a much lower threshold than SRS and significant SBS reflection will prevent the formation of SRS. One possible mechanism that can allow SRS to dominate rather than other nonlinear effects, is that the mode structure of a pulsed laser may form a large number closely-spaced peaks where each peak does not have enough optical power to cause SBS.

Figure 2:
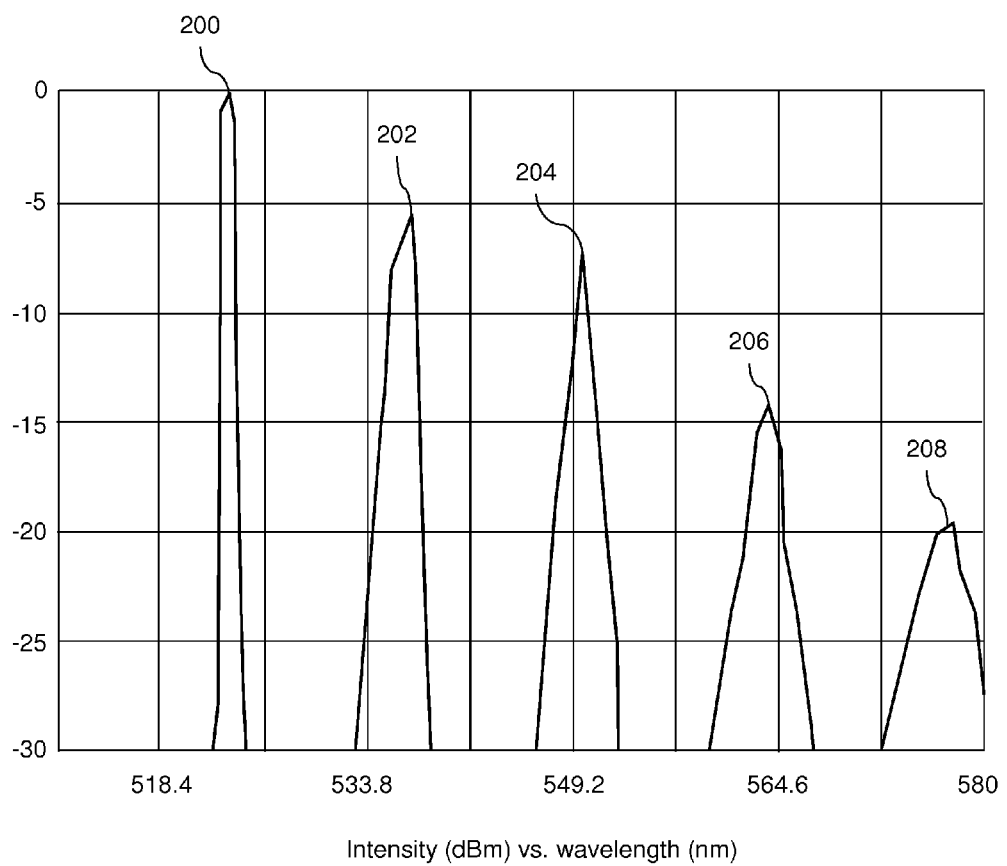
FIG. 2 is a graph of stimulated Raman scattering at high power.

FIG. 2 shows a graph of stimulated Raman scattering at higher power than in FIG. 1. The x-axis represents wavelength in nanometers and the y-axis represents intensity on a logarithmic scale in dBm normalized to the highest peak. First peak 200 at 523.5 nm is light which is not Raman scattered. Second peak 202 at 536.5 nm is a peak shifted by SRS. Note the lower intensity of second peak 202 as compared to first peak 200. Third peak 204 at 550 nm is still lower intensity than second peak 202. Fourth peak 206 at 564 nm is lower than third peak 204, and fifth peak 208 at 578 nm is lower than fourth peak 206. At the higher power of FIG. 2, more power is shifted into the SRS peaks than in the moderate power of FIG. 1. In general, as more power is put into the first peak, more SRS peaks will appear and more power will be shifted into the SRS peaks. In the example of FIGS. 1 and 2, the spacing between the SRS peaks is approximately 13 to 14 nm. As can be seen in FIGS. 1 and 2, SRS produces light over continuous bands of wavelengths which are capable of despeckling by the mechanism of wavelength diversity. Strong despeckling can occur to the point where the output from an optical fiber with SRS shows no visible speckle under most viewing circumstances. Maximum and minimum points for speckle patterns are a function of wavelength, so averaging over more wavelengths reduces speckle. A detailed description of speckle reduction methods can be found in Speckle Phenomena in Optics, by Joseph W. Goodman, Roberts and Company Publishers, 2007, pages 141-186.

Figure 3:
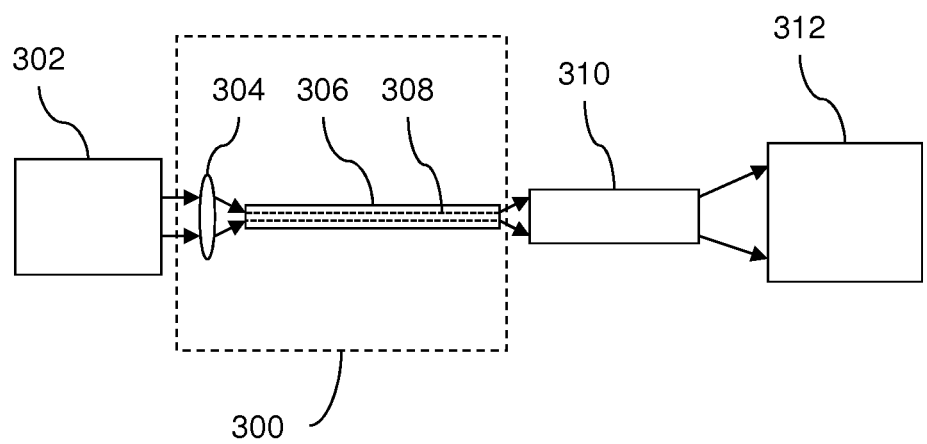
FIG. 3 is a top view of a laser projection system with a despeckling apparatus.

FIG. 3 shows a top view of a laser projection system with a despeckling apparatus based on SRS in an optical fiber. Laser light source 302 illuminates light coupling system 304. Light coupling system 304 illuminates optical fiber 306 which has core 308. Optical fiber 306 illuminates homogenizing device 310. Homogenizing device 310 illuminates digital projector 312. Illuminating means making, passing, or guiding light so that the part which is illuminated utilizes light from the part which illuminates. There may be additional elements not shown in FIG. 3 which are between the parts illuminating and the parts being illuminated. Light coupling system 304 and optical fiber 306 with core 308 form despeckling apparatus 300. Laser light source 302 may be a pulsed laser that has high enough peak power to produce SRS in optical fiber 306. Light coupling system 304 may be one lens, a sequence of lenses, or other optical components designed to focus light into core 308. Optical fiber 306 may be an optical fiber with a core size and length selected to produce the desired amount of SRS. Homogenizing device 310 may be a mixing rod, fly's eye lens, diffuser, or other optical component that improves the spatial uniformity of the light beam. Digital projector 312 may be a projector based on digital micromirror (DMD), liquid crystal device (LCD), liquid crystal on silicon (LCOS), or other digital light valves. Additional elements may be included to further guide or despeckle the light such as additional lenses, diffusers, vibrators, or optical fibers.

For standard fused-silica fiber with a numerical aperture of 0.22, the core size may be 40 micrometers diameter and the length may be 110 meters when the average input power is 3 watts at 523.5 nm. For higher or lower input powers, the length and/or core size may be adjusted appropriately. For example, at higher power, the core size may be increased or the length may be decreased to produce the same amount of SRS as in the 3 watt example. FIG. 1 shows the spectral output of a standard fused-silica fiber with a numerical aperture of 0.22, core size of 40 micrometers diameter and length of 110 meters when the average input power is 2 watts at 523.5 nm. FIG. 2 shows the output of the same system when the average input power is 4 watts. In both cases, the pulsed laser is a Q-switched, frequency-doubled neodymium-doped yttrium lithium fluoride (Nd:YLF) laser which is coupled into the optical fiber with a single aspheric lens that has a focal length of 18.4 mm. Alternatively, a frequency-doubled neodymium-doped yttrium aluminum garnet (Nd:YAG) laser may be used which has an optical output wavelength of 532 nm. The examples of average input powers in this specification are referenced to laser pulses with a pulse width of 50 ns and a frequency of 16.7 kHz.

Figure 4:
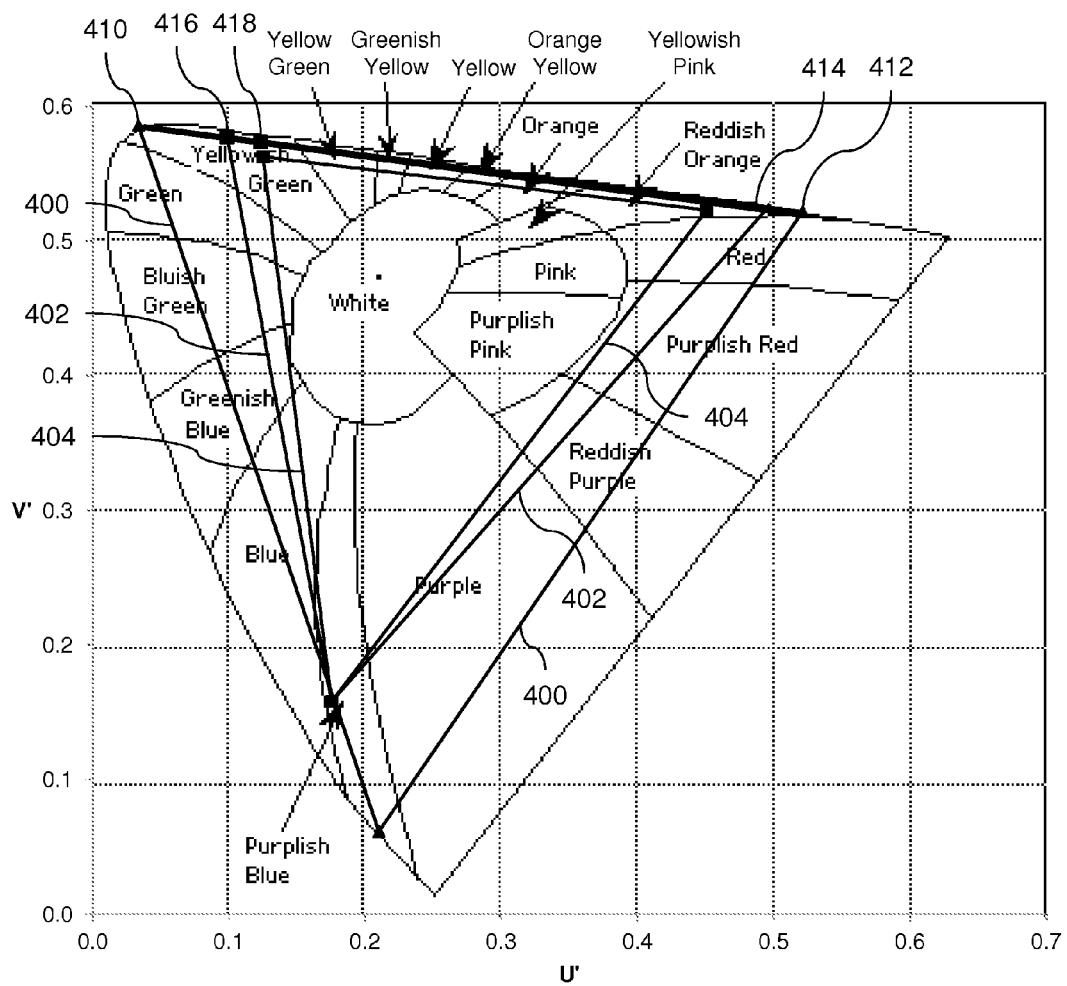
FIG. 4 is a color chart of a laser-projector color gamut compared to the Digital Cinema Initiative (DCI) and Rec. 709 standards.

FIG. 4 shows a color chart of a laser-projector color gamut compared to the DCI and Rec. 709 standards. The x and y axes of FIG. 4 represent the u' and v' coordinates of the Commission Internationale de l'Eclairage (CIE) 1976 color space. Each color gamut is shown as a triangle formed by red, green, and blue primary colors that form the corners of the triangle. Other colors of a digital projector are made by mixing various amounts of the three primaries to form the colors inside the gamut triangle. First triangle 400 shows the color gamut of a laser projector with primary colors at 452 nm, 523.5 nm, and 621 nm. Second triangle 402 shows the color gamut of the DCI standard which is commonly accepted for digital cinema in large venues such as movie theaters. Third triangle 404 shows the color gamut of The International Telecommunication Union Radiocommunication (ITU-R) Recommendation 709 (Rec. 709) standard which is commonly accepted for broadcast of high-definition television. Green point 410 is the green primary of a laser projector at 523.5 nm. Red point 412 is the red primary of a laser projector at 621 nm. Line 414 (shown in bold) represents the possible range of colors along the continuum between green point 410 and red point 412. The colors along line 414 can be are obtained by mixing yellow, orange, and red colors with the primary green color. The more yellow, orange, or red color, the more the color of the green is pulled along line 414 towards the red direction. For the purposes of this specification, "GR color" is defined to be the position along line 414 in percent. For example, pure green at green point 410 has a GR (green-red) color of 0%. Pure red at red point 412 has a GR color of 100%. DCI green point 416 is at u'=0.099 and v'=0.578 and has a GR color of 13.4% which means that the distance between green point 410 and DCI green point 416 is 13.4% of the distance between green point 410 and red point 412. When the Rec. 709 green point of third triangle 404 is extrapolated to line 414, the resultant Rec. 709 green point 418 has a GR color of 18.1%. The concept of GR color is a way to reduce two-dimensional u' v' color as shown in the two-dimensional graph of FIG. 4 to one-dimensional color along line 414 so that other variables can be easily plotted in two dimensions as a function of GR color. In the case of a primary green at 523.5 nm experiencing SRS, the original green color is partially converted to yellow, orange, and red colors, which pull the resultant combination color along line 414 and increase the GR %. Although the DCI green point may be the desired target for the green primary, some variation in the color may be allowable. For example, a variation of approximately +/−0.01 in the u' and v' values may be acceptable.

Figure 5:
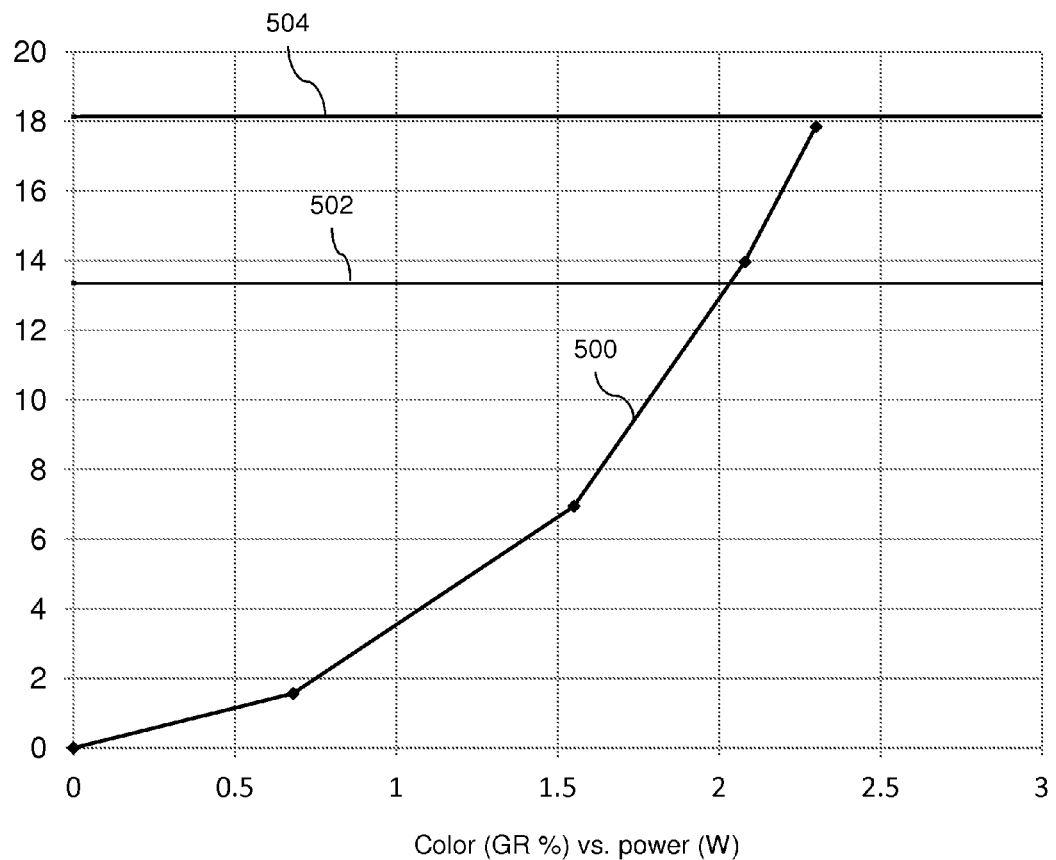
FIG. 5 is a graph of color vs. power for a despeckling apparatus.

FIG. 5 shows a graph of color vs. power for a despeckling apparatus. The x-axis represents power in watts which is output from the optical fiber of a despeckling apparatus such as the one shown in FIG. 3. The y-axis represents the GR color in percent as explained in FIG. 4. The optical fiber has the same parameters as in the previous example (core diameter of 40 micrometers and length of 110 meters). Curve 500 shows how the color varies as a function of the output power. As the output power increases, the GR color gradually increases. The curve can be fit by the third-order polynomial $$GR\ \% = 1.11p^3 + 0.0787p^2 + 1.71p + 0.0041$$

where "p" is the output power in watts. First line 502 represents the DCI green point at a GR color of 13.4%, and second line 504 represents the Rec. 709 green point at approximately 18.1%. The average power output required to reach the DCI green point is approximately 2.1 W, and the average output power required to reach the Rec. 709 point is approximately 2.3 W.

Figure 6:
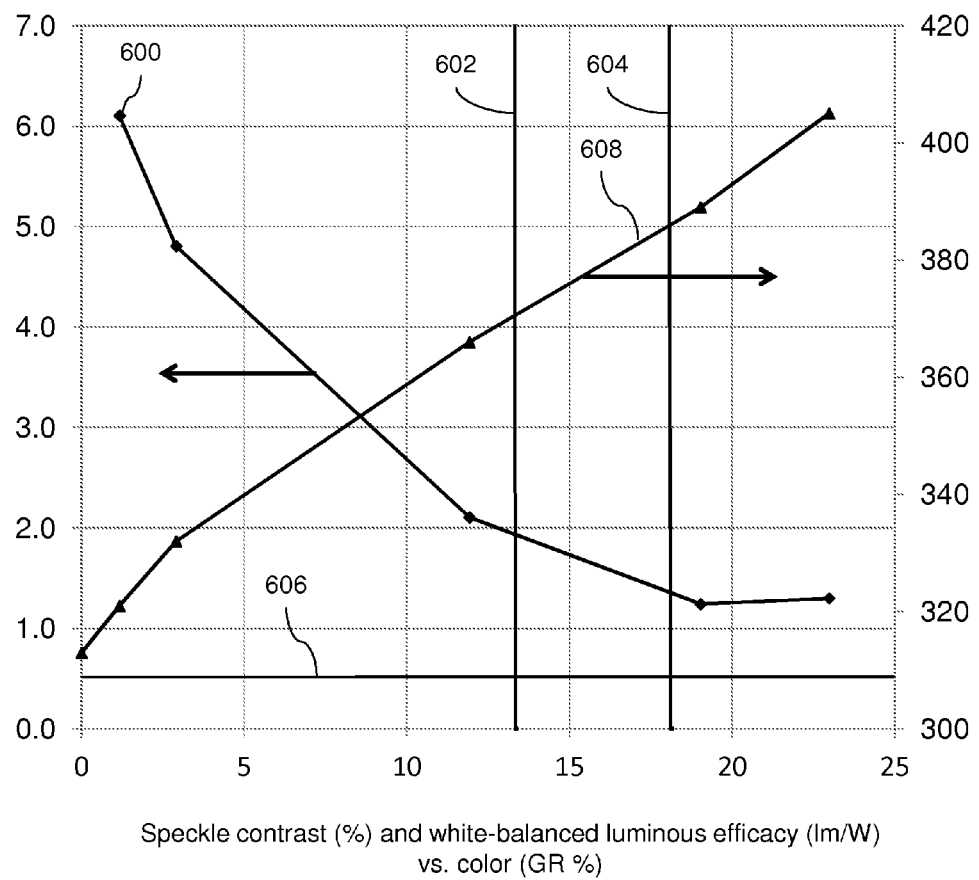
FIG. 6 is a graph of speckle contrast and luminous efficacy vs. color for a despeckling apparatus.

FIG. 6 shows a graph of speckle contrast and luminous efficacy vs. color for a despeckling apparatus such as the one shown in FIG. 3. The x-axis represents GR color in percent. The left y-axis represents speckle contrast in percent, and the right y-axis represents luminous efficacy in lumens per watt. Speckle contrast is a speckle characteristic that quantitatively represents the amount of speckle in an observed image. Speckle contrast is defined as the standard deviation of pixel intensities divided by the mean of pixel intensities for a specific image. Intensity variations due to other factors such as non-uniform illumination or dark lines between pixels (screen door effect) must be eliminated so that only speckle is producing the differences in pixel intensities. Measured speckle contrast is also dependent on the measurement geometry and equipment, so these should be standardized when comparing measurements. Other speckle characteristics may be mathematically defined in order to represent other features of speckle. In the example of FIG. 6, the measurement of speckle contrast was performed by analyzing the pixel intensities of images taken with a Canon EOS Digital Rebel XTi camera at distance of two screen heights. Automatic shutter speed was used and the iris was fixed at a 3 mm diameter by using a lens focal length of 30 mm and an f# of 9.0. Additional measurement parameters included an ISO of 100, monochrome data recording, and manual focus. The projector was a Digital Projection Titan that was illuminated with green laser light from a Q-switched, frequency-doubled, Nd:YLF laser which is coupled into a 40-micrometer core, 110 meter, optical fiber with a single aspheric lens that has a focal length of 18.4 mm. Improved uniformity and a small amount of despeckling was provided by a rotating diffuser at the input to the projector.

For the speckle-contrast measurement parameters described above, 1% speckle is almost invisible to the untrained observer with normal visual acuity when viewing a 100% full-intensity test pattern. Conventional low-gain screens have sparkle or other non-uniformities that can be in the range of 0.1% to 1% when viewed with non-laser projectors. For the purposes of this specification, 1% speckle contrast is taken to be the point where no speckle is observable for most observers under most viewing conditions. 5% speckle contrast is usually quite noticeable to un-trained observes in still images, but is often not visible in moving images.

First curve 600 in FIG. 6 shows the relationship between measured speckle contrast and GR color. As the GR color is increased, the speckle contrast is decreased. Excellent despeckling can be obtained such that the speckle contrast is driven down to the region of no visible speckle near 1%. In the example of FIG. 6, first line 602 represents the DCI green point which has a speckle contrast of approximately 2% and second line 604 represents the Rec. 709 green point which has a speckle contrast of approximately 1%. The speckle contrast obtained in a specific configuration will be a function of many variables including the projector type, laser type, fiber type, diffuser type, and speckle-contrast measurement equipment. Third line 606 represents the minimum measurable speckle contrast for the system. The minimum measurable speckle contrast was determined by illuminating the screen with a broadband white light source and is equal to approximately 0.3% in this example. The minimum measurable speckle contrast is generally determined by factors such as screen non-uniformities (i.e. sparkle) and camera limitations (i.e. noise).

Second curve 608 in FIG. 6 shows the relationship between white-balanced luminous efficacy and GR color. The white-balanced luminous efficacy can be calculated from the spectral response of the human eye and includes the correct amounts of red light at 621 nm and blue light at 452 nm to reach the D63 white point. As the GR color is increased in the range covered by FIG. 6 (0% to 25%) the white-balanced luminous efficacy increases almost linearly from approximately 315 lm/w at a GR color of 0% to approximately 370 lm/w at the DCI green and approximately 385 lm/w at the Rec. 709 green point. This increase in luminous efficacy is beneficial to improve the visible brightness and helps compensate for losses that are incurred by adding the despeckling apparatus.

Figure 7:
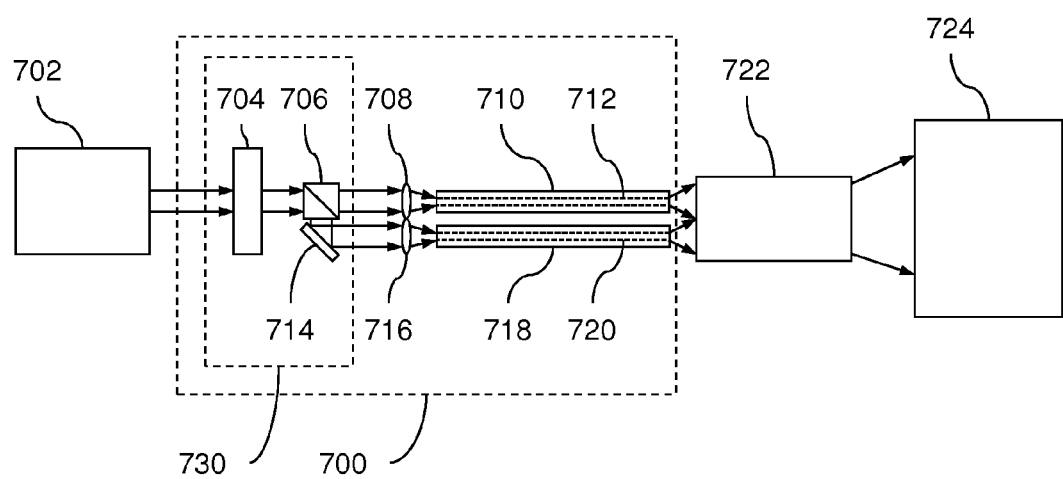
FIG. 7 is a top view of a laser projection system with an adjustable despeckling apparatus.

FIG. 7 shows a top view of a laser projection system with an adjustable despeckling apparatus. FIG. 7 incorporates two fibers for despeckling rather than the one fiber used for despeckling in FIG. 3. The despeckling apparatus of FIG. 3 allows tuning of the desired amount of despeckling and color point by varying the optical power coupled into optical fiber 306. FIG. 7 introduces a new independent variable which is the fraction of optical power coupled into one of the fibers. The balance of the power is coupled into the other fiber. The total power sent through the despeckling apparatus is the sum of the power in each fiber. The additional variable allows the despeckling and color point to be tuned to a single desired operation point for any optical power over a limited range of adjustment.

In FIG. 7, polarized laser light source 702 illuminates rotating waveplate 704. Rotating waveplate 704 changes the polarization vector of the light so that it contains a desired amount of light in each of two polarization states. Rotating waveplate 704 illuminates polarizing beamsplitter (PBS) 706. PBS 706 divides the light into two beams. One beam with one polarization state illuminates first light coupling system 708. The other beam with the orthogonal polarization state reflects off fold mirror 714 and illuminates second light coupling system 716. First light coupling system 708 illuminates first optical fiber 710 which has first core 712. First optical fiber 710 illuminates homogenizing device 722. Second light coupling system 716 illuminates second optical fiber 718 which has core 720. Second optical fiber 718 combines with first optical fiber 710 to illuminate homogenizing device 722. Homogenizing device 722 illuminates projector 724. Rotating waveplate 704, PBS 706, and fold mirror 714 form variable light splitter 730. Variable light splitter 730, first light coupling system 708, second light coupling system 716, first optical fiber 710 with core 712, and second optical fiber 718 with core 720 form despeckling apparatus 700. Laser light source 702 may be a polarized, pulsed laser that has high enough peak power to produce SRS in first optical fiber 710 and second optical fiber 718. First light coupling system 708 and second light coupling system 716 each may be one lens, a sequence of lenses, or other optical components designed to focus light into first core 712 and second core 720 respectively. First optical fiber 710 and second optical fiber 718 each may be an optical fiber with a core size and length selected to produce the desired amount of SRS. First optical fiber 710 and second optical fiber 718 may be the same length or different lengths and may have the same core size or different core sizes. Additional elements may be included to further guide or despeckle the light such as additional lenses, diffusers, vibrators, or optical fibers.

Figure 8:
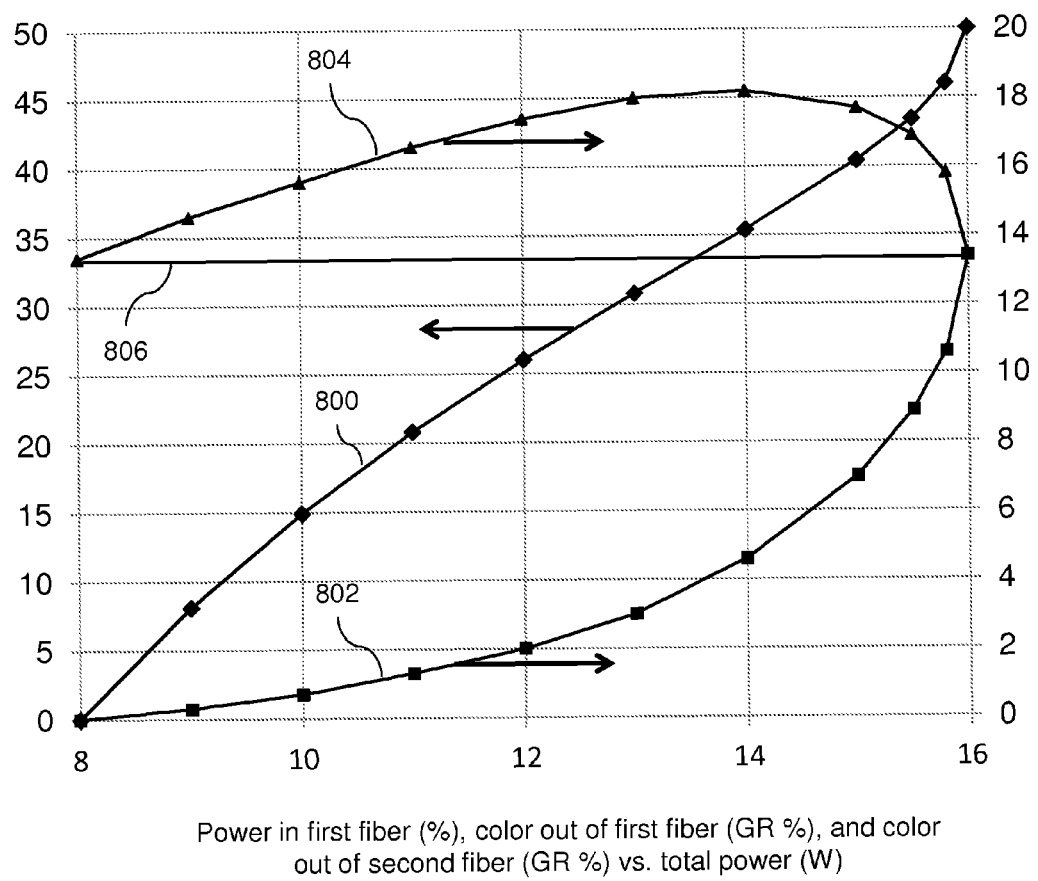
FIG. 8 is a graph of percent power into the first fiber, color out of the first fiber, and color out of the second fiber vs. total power for an adjustable despeckling apparatus.

FIG. 8 shows a graph of power in the first optical fiber, color out of the first optical fiber, and color out of the second optical fiber vs. total power for an adjustable despeckling apparatus of the type shown in FIG. 7. The x-axis represents total average optical power in watts. The mathematical model used to derive FIG. 8 assumes no losses (such as scatter, absorption, or coupling) so the input power in each fiber is equal to the output power from each fiber. The total optical power equals the sum of the power in the first fiber and the second fiber. The left y-axis represents power in percent, and the right y-axis represents GR color in percent. In the example of FIG. 8, the target color is the DCI green point (GR color=13.4%). By adjusting the variable light splitter, all points in FIG. 8 maintain the DCI green point for the combined outputs of the two fibers. The two fibers are identical and each has a core diameter and length selected such that they reach the DCI green point at 8 watts of average optical power. The cubic polynomial fit described for FIG. 5 is used for the mathematical simulation of FIG. 8. First curve 800 represents the power in the first fiber necessary to keep the combined total output of both fibers at the DCI green color point. Line 806 in FIG. 8 represents the DCI green color point at a GR color of 13.4%. At 8 watts of total average power, 0% power into the first fiber and 100% power into the second fiber gives the DCI green point because the second fiber is selected to give the DCI green point. As the total power is increased, the variable light splitter is adjusted so that more power is carried by the first fiber. The non-linear relationship between power and color (as shown in curve 500 of FIG. 5) allows the combined output of both fibers to stay at the DCI green point while the total power is increased. At the maximum average power of 16 watts, the first fiber has 50% of the total power, the second fiber has 50% of the total power, and each fiber carries 8 watts.

Second curve 802 in FIG. 8 represents the color of the output of the first fiber. Third curve 804 in FIG. 8 represents the color of the output of the second fiber. Third curve 804 reaches a maximum at approximately 14 watts of total average power which is approximately 9 watts of average power in the second fiber. Because 9 watts is larger than the 8 watts necessary to reach DCI green in the second fiber, the GR color of light out of the second fiber is approximately 18% which is higher than the 13.4% for DCI green. As the total average power is increased to higher than 14 watts, the amount of light in the second fiber is decreased. When 16 watts of total average power is reached, each fiber reaches 8 watts of average power. The example of FIG. 8 shows that by adjusting the amount of power in each fiber, the overall color may be held constant at DCI green even though the total average power varies from 8 to 16 watts. Although not shown in FIG. 8, the despeckling is also held approximately constant over the same power range.

The previous example uses two fibers of equal length, but the lengths may be unequal in order to accomplish specific goals such as lowest possible loss due to scattering along the fiber length, ease of construction, or maximum coupling into the fibers. In an extreme case, only one fiber may be used, so that the second path does not pass through a fiber. Instead of a variable light splitter based on polarization, other types of variable light splitters may be used. One example is a variable light splitter based on a wedged multilayer coating that moves to provide more or less reflection and transmission as the substrate position varies. Mirror coatings patterned on glass can accomplish the same effect by using a dense minor fill pattern on one side of the substrate and a sparse minor fill pattern on the other side of the substrate. The variable light splitter may be under software control and feedback may be used to determine the adjustment of the variable light splitter. The parameter used for feedback may be color, intensity, speckle contrast, or any other measurable characteristic of light. A filter to transmit only the Raman-shifted light, only one Raman peaks, or specifically selected Raman peaks may be used with a photo detector. By comparing to the total amount of green light or comparing to the un-shifted green peak, the amount of despeckling may be determined. Other adjustment methods may be used instead of or in addition to the two-fiber despeckler shown in FIG. 7. For example, variable optical attenuators may be incorporated into the fiber, the numerical aperture of launch into the fiber may be varied, or fiber bend radius may be varied.

The example of FIG. 8 is a mathematical approximation which does not include second order effects such as loss and the actual spectrum of SRS. Operational tests of an adjustable despeckler using two identical fibers according to the diagram in FIG. 7 show that the actual range of adjustability may be approximately 75% larger than the range shown in FIG. 8.

Figure 9:
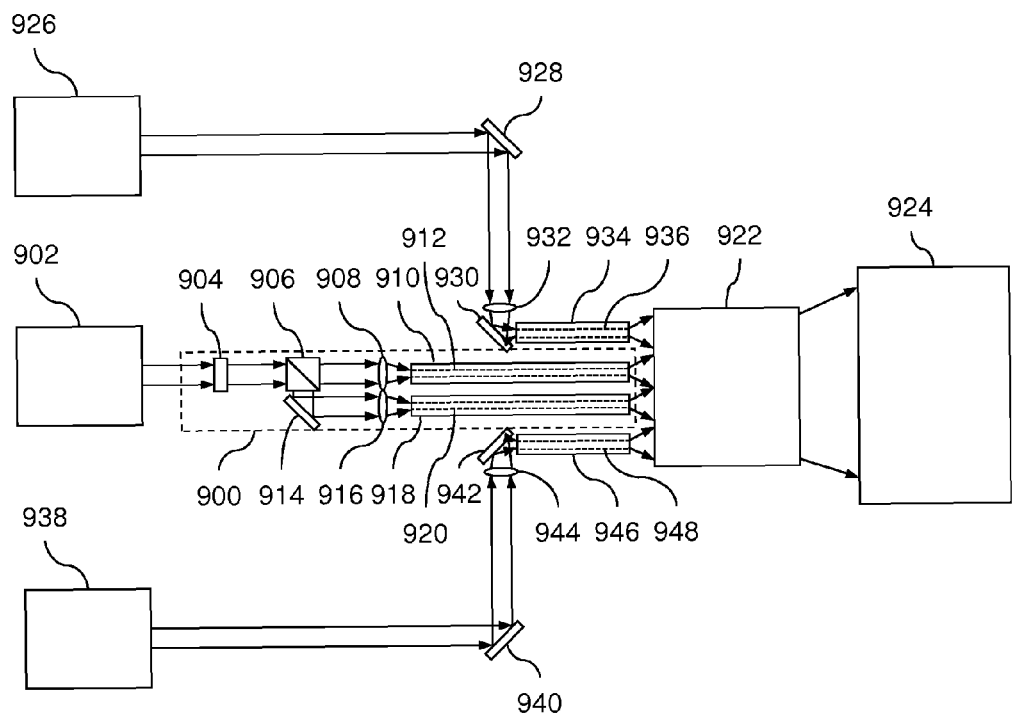
FIG. 9 is a top view of a three-color laser projection system with an adjustable despeckling apparatus.

For a three-color laser projector, all three colors must have low speckle for the resultant full-color image to have low speckle. If the green light is formed from a doubled, pulsed laser and the red and blue light are formed by an optical parametric amplifier (OPO) from the green light, the red and blue light may have naturally low speckle because of the broadening of the red and blue light from the OPO. A despeckling apparatus such as the one described in FIG. 7 may be used to despeckle only the green light. A top view of such a system is shown in FIG. 9. First laser light source 926 illuminates first fold minor 928 which illuminates light coupling system 932. Light coupling system 932 illuminates second fold minor 930. Second fold mirror 930 illuminates optical fiber 934 which has core 936. Optical fiber 934 illuminates homogenizing device 922. Second laser light source 902 illuminates rotating waveplate 904. Rotating waveplate 904 changes the polarization vector of the light so that it contains a desired amount of light in each of two polarization states. Rotating waveplate 904 illuminates PBS 906. PBS 906 divides the light into two beams. One beam with one polarization state illuminates second light coupling system 908. The other beam with the orthogonal polarization state reflects off third fold minor 914 and illuminates third light coupling system 916. Second light coupling system 908 illuminates second optical fiber 910 which has second core 912. Second optical fiber 910 combines with first optical fiber 934 to illuminate homogenizing device 922. Third light coupling system 916 illuminates third optical fiber 918 which has core 920. Third optical fiber 918 combines with first optical fiber 934 and second optical fiber 910 to illuminate homogenizing device 922. Third laser light source 938 illuminates fourth fold minor 940 which illuminates fourth light coupling system 944. Fourth light coupling system 944 illuminates fifth fold mirror 942. Fifth fold mirror 942 illuminates optical fiber 946 which has core 948. Fourth optical fiber 946 combines with first optical fiber 934, second optical fiber 910, and third optical fiber 918 to illuminate homogenizing device 922. Homogenizing device 922 illuminates projector 924. Rotating waveplate 904, PBS 906, third fold minor 914, second light coupling system 908, third light coupling system 916, second optical fiber 910 with core 912, and third optical fiber 918 with core 920 form despeckling apparatus 900. First laser light source 926 may be a red laser, second laser light source 902 may be a green laser, and third laser light source 938 may be a blue laser. First laser light source 926 and third laser light source 938 may be formed by an OPO which operates on light from second laser light source 902. Second laser light source 902 may be a pulsed laser that has high enough peak power to produce SRS in second optical fiber 910 and third optical fiber 918. Additional elements may be included to further guide or despeckle the light such as additional lenses, diffusers, vibrators, or optical fibers.

FIG. 9 shows one color of light in each fiber. Alternatively, more than one color can be combined into a single fiber. For example, red light and blue light can both be carried by the same fiber, so that the total number of fibers is reduced from four to three. Another possibility is to combine red light and one green light in one fiber and combine blue light and the other green light in another fiber so that the total number of fibers is reduced to two.

Figure 10:
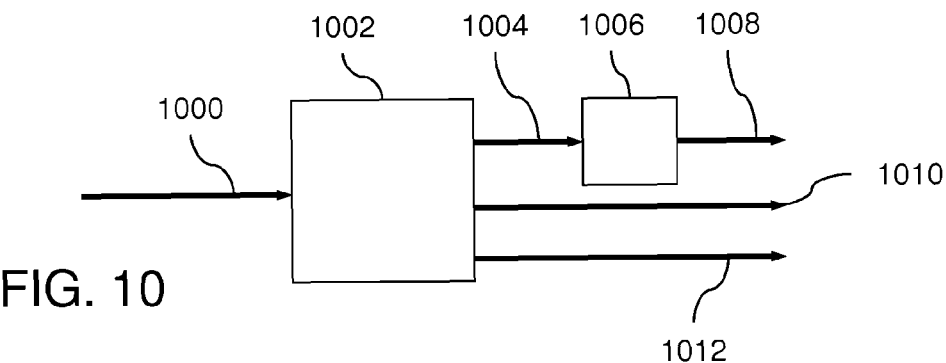
FIG. 10 is a block diagram of a three-color laser projection system with despeckling of light taken after an OPO.

The despeckling apparatus may operate on light taken before, after, or both before and after an OPO. The optimum location of the despeckling apparatus in the system may depend on various factors such as the amount of optical power available at each stage and the amount of despeckling desired. FIG. 10 shows a block diagram of a three-color laser projection system with despeckling of light taken after an OPO. First beam 1000 enters OPO 1002. OPO 1002 generates second beam 1004, fourth beam 1010, and fifth beam 1012. Second beam 1004 enters despeckling apparatus 1006. Despeckling apparatus 1006 generates third beam 1008. First beam 1000, second beam 1004, and third beam 1008 may be green light. Fourth beam 1010 may be red light, and fifth beam 1012 may be blue light. Despeckling apparatus 1006 may be a fixed despeckler or an adjustable despeckler.

Figure 11:
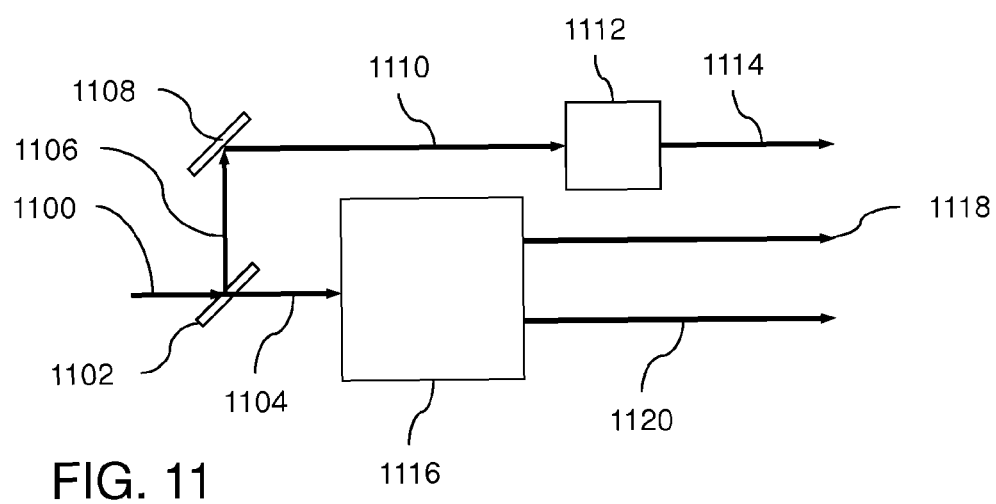
FIG. 11 is a block diagram of a three-color laser projection system with despeckling of light taken before an OPO.

FIG. 11 shows a block diagram of a three-color laser projection system with despeckling of light taken before an OPO. First beam 1100 is divided into second beam 1104 and third beam 1106 by splitter 1102. Third beam 1106 reflects from fold minor 1108 to create fourth beam 1110. Fourth beam 1110 enters despeckling apparatus 1112. Despeckling apparatus 1112 generates fifth beam 1114. Second beam 1104 enters OPO 1116. OPO 1116 generates sixth beam 1118 and seventh beam 1120. First beam 1100, second beam 1104, third beam 1106, fourth beam 1110, and fifth beam 1114 may be green light. Sixth beam 1118 may be red light, and seventh beam 1120 may be blue light. Splitter 1102 may be a fixed splitter or a variable splitter. Despeckling apparatus 1112 may be a fixed despeckler or an adjustable despeckler.

Figure 12:
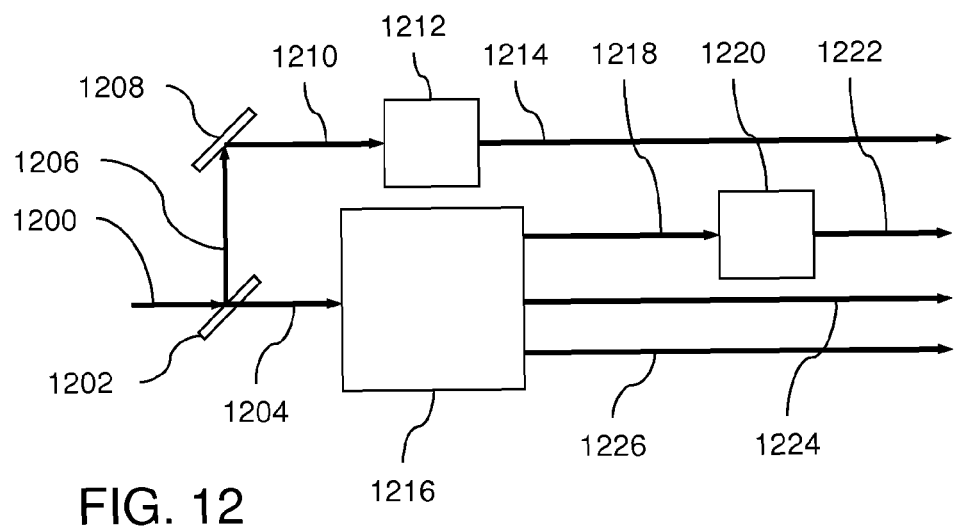
FIG. 12 is a block diagram of a three-color laser projection system with despeckling of light taken before and after an OPO.

FIG. 12 shows a block diagram of a three-color laser projection system with despeckling of light taken before and after an OPO. First beam 1200 is divided into second beam 1204 and third beam 1206 by splitter 1202. Third beam 1206 reflects from fold minor 1208 to create fourth beam 1210. Fourth beam 1210 enters first despeckling apparatus 1212. First despeckling apparatus 1212 generates fifth beam 1214. Second beam 1204 enters OPO 1216. OPO 1216 generates sixth beam 1218, seventh beam 1224, and eighth beam 1226. Sixth beam 1218 enters second despeckling apparatus 1220. Second despeckling apparatus 1220 generates ninth beam 1222. First beam 1200, second beam 1204, third beam 1206, fourth beam 1210, fifth beam 1214, sixth beam 1218, and ninth beam 1222 may be green light. Seventh beam 1224 may be red light, and eighth beam 1226 may be blue light. Splitter 1202 may be a fixed splitter or a variable splitter. First despeckling apparatus 1212 and second despeckling apparatus 1220 may be fixed despecklers or adjustable despecklers.

Figure 13:
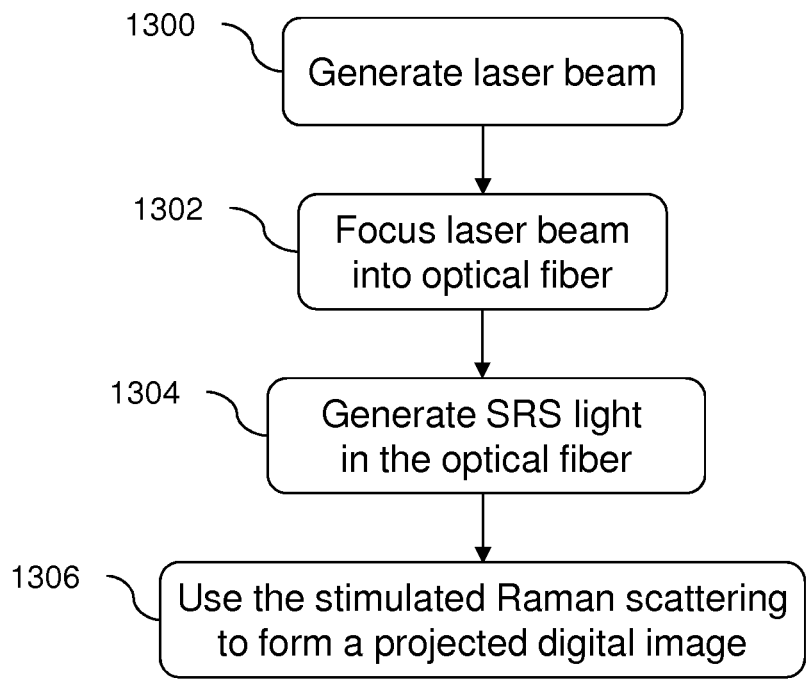
FIG. 13 is a flowchart of a despeckling method.

FIG. 13 shows a despeckling method that corresponds to the apparatus shown in FIG. 3. In step 1300, a laser beam is generated. In step 1302, the laser beam is focused into the core of an optical fiber. In step 1304, SRS light is generated in the optical fiber. In step 1306, the SRS light is used to form a projected digital image. Additional steps such as homogenizing, mixing, splitting, recombining, and further despeckling may also be included.

Figure 14:
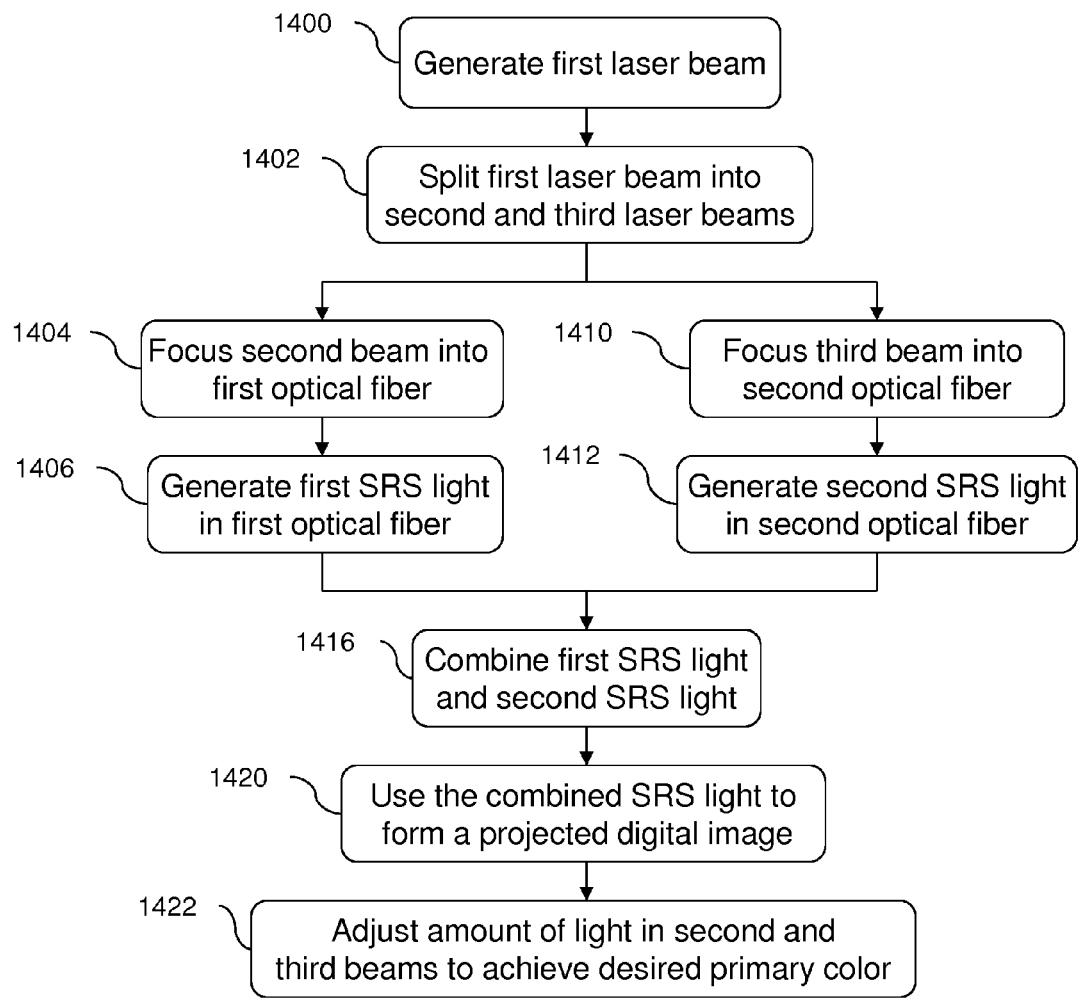
FIG. 14 is a flowchart of an adjustable despeckling method.

FIG. 14 shows an adjustable despeckling method that corresponds to the apparatus shown in FIG. 7. In step 1400, a first laser beam is generated. In step 1402, the first laser beam is split into second and third laser beams. In step 1404, the second laser beam is focused into the core of a first optical fiber. In step 1406, first SRS light is generated in the first optical fiber. In step 1410, the third laser beam is focused into the core of a second optical fiber. In step 1412, second SRS light is generated in the second optical fiber. In step 1416, the first SRS light and the second SRS light is combined. In step 1420, the combined SRS light is used to form a projected digital image. In step 1422, the amount of light in the second and third beams is adjusted to achieve a desired primary color. Additional steps such as homogenizing, mixing, further splitting, further recombining, and further despeckling may also be included.

Fibers used to generate SRS in a fiber-based despeckling apparatus may be single mode fibers or multimode fibers. Single mode fibers generally have a core diameter less than 10 micrometers. Multimode fibers generally have a core diameter greater than 10 micrometers. Multimode fibers may typically have core sizes in the range of 20 to 400 micrometers to generate the desired amount of SRS depending on the optical power required. For very high powers, even larger core sizes such as 1000 microns or 1500 microns may experience SRS. In general, if the power per cross-sectional area is high enough, SRS will occur. A larger cross-sectional area will require a longer length of fiber, if all other variables are held equal. The cladding of multimode fibers may have a diameter of 125 micrometers. The average optical power input into a multimode fiber to generate SRS may be in the range of 1 to 200 watts. The average optical power input into a single mode fiber to generate SRS is generally smaller than the average optical power required to generate SRS in a multimode fiber. The length of the multimode fiber may be in the range of 10 to 300 meters. For average optical power inputs in the range of 3 to 100 watts, the fiber may have a core size of 40 to 62.5 micrometers and a length of 50 to 100 meters. The core material of the optical fiber may be conventional fused silica or the core may be doped with materials such as germanium to increase the SRS effect or change the wavelengths of the SRS peaks.

In order to generate SRS, a large amount of optical power must be coupled into an optical fiber with a limited core diameter. For efficient and reliable coupling, specially built lenses, fibers, and alignment techniques may be necessary. 80 to 90% of the optical power in a free-space laser beam can usually be coupled into a multimode optical fiber. Large-diameter end caps, metalized fibers, double clad fibers, anti-reflection coatings on fiber faces, gradient index lenses, high temperature adhesives, and other methods are commercially available to couple many tens of watts of average optical power into fibers with core diameters in the range of 30 to 50 micrometers. Photonic or "holey" fibers may be used to make larger diameters with maintaining approximately the same Raman shifting effect. Average optical power in the hundreds of watts can be coupled into fibers with core sizes in the range of 50 to 100 micrometers. The maximum amount of SRS, and therefore the minimum amount of speckle, may be determined by the maximum power that can be reliably coupled into fibers.

Optical fibers experience scattering and absorption which cause loss of optical power. In the visible light region, the main loss is scattering. Conventional fused silica optical fiber has a loss of approximately 15 dB per kilometer in the green. Specially manufactured fiber may be green-optimized so that the loss is 10 dB per kilometer or less in the green. Loss in the blue tends to be higher than loss in the green. Loss in the red tends to be lower than loss in the green. Even with low-loss fiber, the length of fiber used for despeckling may be kept as short as possible to reduce loss. Shorter fiber means smaller core diameter to reach the same amount of SRS and therefore the same amount of despeckling. Since the difficulty of coupling high power may place a limit on the amount of power that can be coupled into a small core, coupling may also limit the minimum length of the fiber.

Lasers used with a fiber-based despeckling apparatus may be pulsed in order to reach the high peak powers required for SRS. The pulse width of the optical pulses may be in the range of 5 to 100 ns. Pulse frequencies may be in the range of 5 to 300 kHz. Peak powers may be in the range of 1 to 1000 W. The peak power per area of core (PPPA) is a metric that can help predict the amount of SRS obtained. The PPPA may be in the range of 1 to 5 kW per micrometer$^2$ in order to produce adequate SRS for despeckling. Pulsed lasers may be formed by active or passive Q-switching or other methods that can reach high peak power. The mode structure of the pulsed laser may include many peaks closely spaced in wavelength. Other nonlinear effects in addition to SRS may be used to add further despeckling. For example, self-phase modulation or four wave mixing may further broaden the spectrum to provide additional despeckling. Infrared light may be introduced to the fiber to increase the nonlinear broadening effects.

The despeckling apparatus of FIG. 3 or adjustable despeckling apparatus of FIG. 7 may be used to generate more than one primary color. For example, red primary light may be generated from green light by SRS in an optical fiber to supply some or all of the red light required for a full-color projection display. Since the SRS light has low speckle, adding SRS light to other laser light may reduce the amount of speckle in the combined light. Alternatively, if the starting laser is blue, some or all of the green primary light and red primary light may be generated from blue light by SRS in an optical fiber. Filters may be employed to remove unwanted SRS peaks. In the case of SRS from green light, the red light may be filtered out, or all peaks except the first SRS peak may be filtered out. This filtering will reduce the color change for a given amount of despeckling, but comes at the expense of efficiency if the filtered peaks are not used to help form the viewed image. Filtering out all or part of the un-shifted peak may decrease the speckle because the un-shifted peak typically has a narrower bandwidth than the shifted peaks.

The un-shifted peak after fiber despeckling is a narrow peak that contributes to the speckle of the light exciting the fiber. This unshifted peak may be filtered out from the spectrum (for example using a dichroic filter) and sent into a second despeckling fiber to make further Raman-shifted peaks and thus reduce the intensity of the un-shifted peak while retaining high efficiency. Additional despeckling fibers may cascaded if desired as long as sufficient energy is available in the un-shifted peak.

There are usually three primary colors in conventional full-color display devices, but additional primary colors may also be generated to make, for example, a four-color system or a five-color system. By dividing the SRS light with beam-splitters, the peaks which fall into each color range can be combined together to form each desired primary color. A four-color system may consist of red, green, and blue primaries with an additional yellow primary generated from green light by SRS in an optical fiber. Another four-color system may be formed by a red primary, a blue primary, a green primary in the range of 490 to 520 nm, and another green primary in the range of 520 to 550 nm, where the green primary in the range of 520 to 550 nm is generated by SRS from the green primary in the range of 490 to 520 nm. A five-color system may have a red primary, a blue primary, a green primary in the range of 490 to 520 nm, another green primary in the range of 520 to 550 nm, and a yellow primary, where the green primary in the range of 520 to 550 nm and the yellow primary are generated by SRS from the green primary in the range of 490 to 520 nm.

3D projected images may be formed by using SRS light to generate some or all of the peaks in a six-primary 3D system. Wavelengths utilized for a laser-based six-primary 3D system may be approximately 440 and 450 nm, 525 and 540 nm, and 620 and 640 nm in order to fit the colors into the blue, green, and red bands respectively and have sufficient spacing between the two sets to allow separation by filter glasses. Since the spacing of SRS peaks from a pure fused-silica core is 13.2 THz, this sets a spacing of approximately 9 nm in the blue, 13 nm in the green, and 17 nm in the red. Therefore, a second set of primary wavelengths at 449 nm, 538 nm, and 637 nm can be formed from the first set of primary wavelengths at 440 nm, 525 nm, and 620 nm by utilizing the first SRS-shifted peaks. The second set of primaries may be generated in three separate fibers, or all three may be generated in one fiber. Doping of the fiber core may be used to change the spacing or generate additional peaks.

Another method for creating a six-primary 3D system is to use the un-shifted (original) green peak plus the third SRS-shifted peak for one green channel and use the first SRS-shifted peak plus the second SRS-shifted peak for the other green channel. Fourth, fifth, and additional SRS-shifted peaks may also be combined with the un-shifted and third SRS-shifted peaks. This method has the advantage of roughly balancing the powers in the two channels. One eye will receive an image with more speckle than the other eye, but the brain can fuse a more speckled image in one eye with a less speckled image in the other eye to form one image with a speckle level that averages the two images. Another advantage is that although the wavelengths of the two green channels are different, the color of the two channels will be more closely matched than when using two single peaks from adjacent green channels. Two red channels and two blue channels may be produced with different temperatures in two OPOs which naturally despeckle the light.

Almost degenerate OPO operation can produce two wavelengths that are only slightly separated. In the case of green light generation, two different bands of green light are produced rather than red and blue bands. The two green wavelengths may be used for the two green primaries of a six-primary 3D system. If the OPO is tuned so that its two green wavelengths are separated by the SRS shift spacing, SRS-shifted peaks from both original green wavelengths will line up at the same wavelengths. This method can be used to despeckle a system utilizing one or more degenerate OPOs.

A different starting wavelength may used to increase the amount of Raman-shifted light while still maintaining a fixed green point such as DCI green. For example, a laser that generates light at 515 nm may be used as the starting wavelength and more Raman-shifted light generated to reach the DCI green point when compared to a starting wavelength of 523.5 nm. The effect of starting at 515 nm is that the resultant light at the same green point will have less speckle than light starting at 523.5 nm.

When two separate green lasers, one starting at 523.5 nm and one starting at 515 nm, are both fiber despeckled and then combined into one system, the resultant speckle will be even less than each system separately because of the increased spectral diversity. The Raman-shifted peaks from these two lasers will interleave to make a resultant waveform with approximately twice as many peaks as each green laser would have with separate operation.

A separate blue boost may also be added from a narrow band laser at any desired wavelength because speckle is very hard to see in blue even with narrow band light. The blue boost may be a diode-pumped solid-state (DPSS) or direct diode laser. The blue boost may form one of the blue peaks in a six-primary 3D display. If blue boost is used, any OPOs in the system may be tuned to produce primarily red or red only so as to increase the red efficiency.

Peaks that are SRS-shifted from green to red may be added to the red light from an OPO or may be used to supply all the red light if there is no OPO. In the case of six-primary 3D, one or more peaks shifted to red may form or help form one or more of the red channels.

Instead of or in addition to fused silica, materials may be used that add, remove, or alter SRS peaks as desired. These additional materials may be dopants or may be bulk materials added at the beginning or the end of the optical fiber.

The cladding of the optical fiber keeps the peak power density high in the fiber core by containing the light in a small volume. Instead of or in addition to cladding, various methods may be used to contain the light such as minors, focusing optics, or multi-pass optics. Instead of an optical fiber, larger diameter optics may used such as a bulk glass or crystal rod or rectangular parallelepiped. Multiple passes through a crystal or rod may be required to build sufficient intensity to generate SRS. Liquid waveguides may be used and may add flexibility when the diameter is increased.

Polarization-preserving fiber or other polarization-preserving optical elements may be used to contain the light that generates SRS. A rectangular-cross-section integrating rod or rectangular-cross-section fiber are examples of polarization-preserving elements. Polarization-preserving fibers may include core asymmetry or multiple stress-raising rods that guide polarized light in such a way as to maintain polarization.

In a typical projection system, there is a trade-off between brightness, contrast ratio, uniformity, and speckle. High illumination f# tends to produce high brightness and high contrast ratio, but also tends to give low uniformity and more speckle. Low illumination f# tends to produce high uniformity and low speckle, but also tends to give low brightness and low contrast ratio. By using spectral broadening to reduce speckle, the f# of the illumination system can be raised to help increase brightness and contrast ratio while keeping low speckle. Additional changes may be required to make high uniformity at high f#, such as a longer integrating rod, or other homogenization techniques which are known and used in projection illumination assemblies.

If two OPOs are used together, the OPOs may be adjusted to slightly different temperatures so that the resultant wavelengths are different. Although the net wavelength can still achieve the target color, the bandwidth is increased to be the sum of the bandwidths of the individual OPOs. Increased despeckling will result from the increased bandwidth. The bands produced by each OPO may be adjacent, or may be separated by a gap. In the case of red and blue generation, both red and blue will be widened when using this technique. For systems with three primary colors, there may be two closely-spaced red peaks, four or more green peaks, and two closely-spaced blue peaks. For systems with six primary colors, there may be three or more red peaks with two or more of the red peaks being closely spaced, four or more green peaks, and three or more blue peaks with two or more of the blue peaks being closely spaced. Instead of OPOs, other laser technologies may be used that can generate the required multiple wavelengths.

Screen vibration or shaking is a well-known method of reducing speckle. The amount of screen vibration necessary to reduce speckle to a tolerable level depends on a variety of factors including the spectral diversity of the laser light impinging on the screen. By using Raman to broaden the spectrum of light, the required screen vibration can be dramatically reduced even for silver screens or high-gain white screens that are commonly used for polarized 3D or very large theaters. These specialized screens typically show more speckle than low-gain screens. When using Raman despeckling, screen vibration may be reduced to a level on the order of a millimeter or even a fraction of a millimeter, so that screen vibration becomes practical and easily applied even in the case of large cinema screens.

A combination of green laser diodes and green pulsed lasers may be used to form a multiple-laser projection system with improved bit depth. The green pulsed lasers may be despeckled by using Raman shift in an optical fiber. The pulsed lasers may be formed from DPSS lasers. The green laser diodes and the green pulsed lasers may be switched to improve the bit depth of a projected image. Even when the repetition rate of the green pulsed lasers is less than 100 kHz, 10 bit operation or higher can be achieved in a projected digital image.

Cinema quality projection systems generally achieve 10 bits of bit depth in the projected digital image. The bit depth possible with a pulsed laser depends on the repetition rate of the pulses. In conventional pulsed-laser projection systems, approximately 100 kHz is necessary to achieve 10 bits. A somewhat lower repetition rate, such as 90 kHz can make an image that looks almost as good as the image made with 100 kHz, but significantly lower frequency, such as 50 kHz or less, degrades the quality of the image because the bit depth drops to 9 bits for 50 kHz, 8 bits for 25 kHz, and 7 bits for 12.5 kHz. On the other hand, high-power pulsed green lasers at 100 kHz tend to be complex architectures such as master-oscillator power amplifier (MOPA) designs with many stages of amplification necessary to reach the power level required for cinema applications. Simpler designs such as green high-power oscillators generally run at lower repetition rates in the range of 10 to 50 kHz. The simultaneous needs for low repetition rate and high bit depth may be met by using the highest possible repetition rate that is compatible with high power output along with synchronized switching of individual lasers to achieve additional bit depth.

Figure 15:
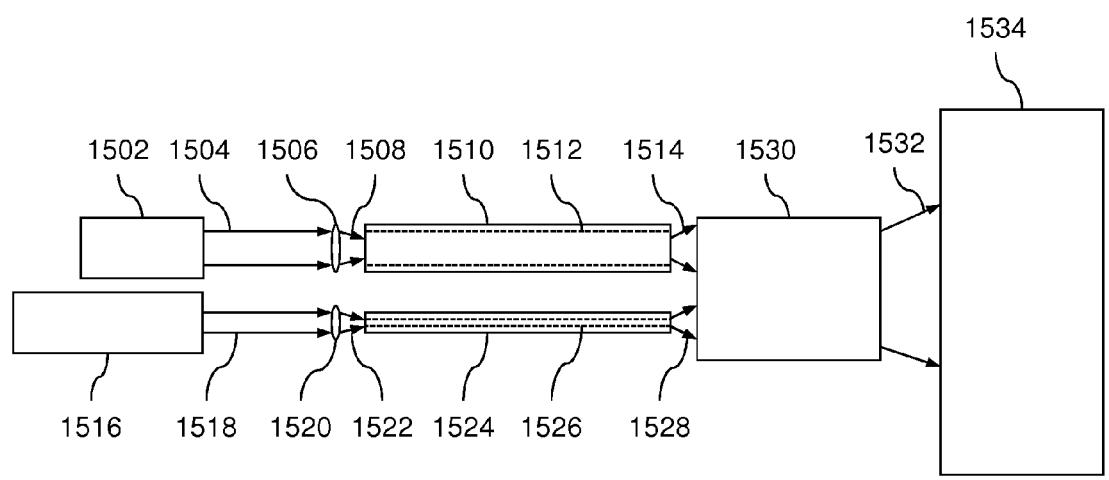
FIG. 15 is a top view of a laser projector system that includes a green laser diode assembly and a green pulsed laser.

FIG. 15 shows a top view of a laser projector system that includes a green laser diode assembly and a green pulsed laser. Green laser diode assembly 1502 generates first light beam 1504. First light beam 1504 illuminates first light coupling system 1506. First light coupling system 1506 generates second light beam 1508. Second light beam 1508 illuminates first optical fiber 1510 which has first core 1512. First optical fiber 1510 generates third light beam 1514. Third light beam 1514 illuminates homogenizing device 1530. Green pulsed laser 1516 generates fourth light beam 1518. Fourth light beam 1518 illuminates second light coupling system 1520. Second light coupling system 1520 generates fifth light beam 1522. Fifth light beam 1522 illuminates second optical fiber 1524 which has second core 1526. Second optical fiber 1524 generates sixth light beam 1528. Sixth light beam 1528 illuminates homogenizing device 1530. Homogenizing device 1532 combines third light beam 1514 with sixth light beam 1528 to generate seventh light beam 1532. Seventh light beam 1532 illuminates digital projector 1534.

There may be additional elements not shown in FIG. 15 which are between the parts illuminating and the parts being illuminated. For example, there may be additional lenses before homogenizing device 1532 to adjust the divergence of the light beams so that the homogenizing device operates with the proper amount of homogenization. Green laser diode assembly 1502 does not generate SRS in first optical fiber 1510. Green pulsed laser 1516 is a pulsed laser that has high enough peak power to produce SRS in second optical fiber 1524. Green pulsed laser 1516 may be a DPSS laser. First light coupling system 1506 and second light coupling system 1520 may each be one lens, a sequence of lenses, or other optical components designed to focus light into first core 1512 and second core 1526. Second optical fiber 1524 may be an optical fiber with a core size and length selected to produce the desired amount of SRS. Homogenizing device 1530 may be a mixing rod, fly's eye lens, diffuser, or other optical component that improves the spatial uniformity of the light beam. Digital projector 1534 may be a projector based on digital micromirror (DMD) light valves. Green pulsed laser 1516 may have a repetition rate significantly less than 100 kHz. For example, the repetition rate may be 25 kHz, 50 kHz, or in the range of 5 to 90 kHz. Green laser diode assembly 1502 or green pulsed laser 1516 may be switched on and off to improve the bit depth of the image formed by digital projector 1534. Additional elements may be included to further guide or despeckle the light such as additional lenses, diffusers, vibrators, or optical fibers. Instead of homogenizing element 1530, other ways may be employed to combine the light from green laser diode assembly 1502 and green pulsed laser 1516. Laser diode assembly 1502 may include multiple green laser diodes aggregated to increase the power and bandwidth.

Figure 16:
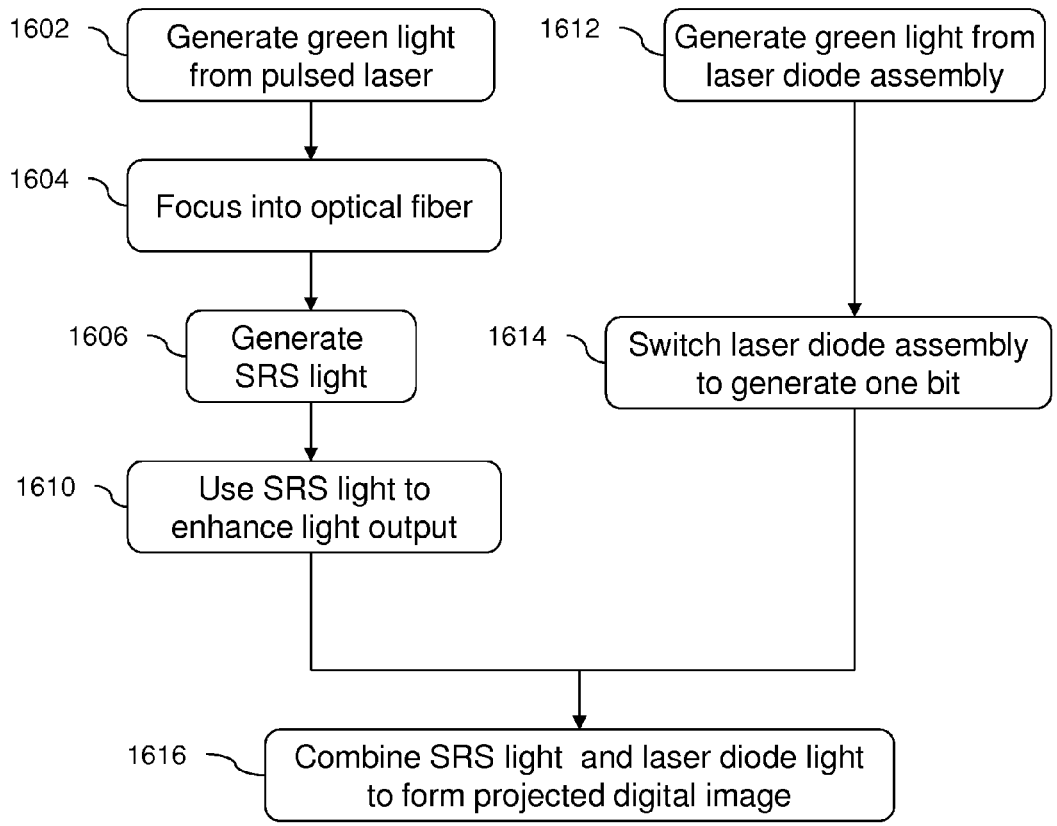
FIG. 16 is a flowchart of a method of improving bit depth with a green laser diode assembly and a green pulsed laser.

FIG. 16 shows a flowchart of a method of improving bit depth with a green laser diode assembly and a green pulsed laser. In step 1602, green light is generated from a pulsed laser. In step 1604, the green light from the pulsed laser is focused into an optical fiber. In step 1606, SRS light is generated in the optical fiber. In step 1610, the SRS light is used to enhance the light output from the optical fiber. In step 1612, green light is generated from a laser diode assembly. In step 1614 the laser diode assembly is switched on and off to generate one bit of bit depth. In step 1616, the light from the optical fiber and the light from the laser diode assembly are combined to form a projected digital image. Enhancing the light output from the optical fiber may include reducing speckle, changing the color of the light, or changing any other optical property of the light to improve the quality of the light for the purpose of forming images. Multiple laser diodes may be aggregated in step 1612 and their light may be fiber delivered prior to combining with the light from the optical fiber used in step 1604.

Figure 17:
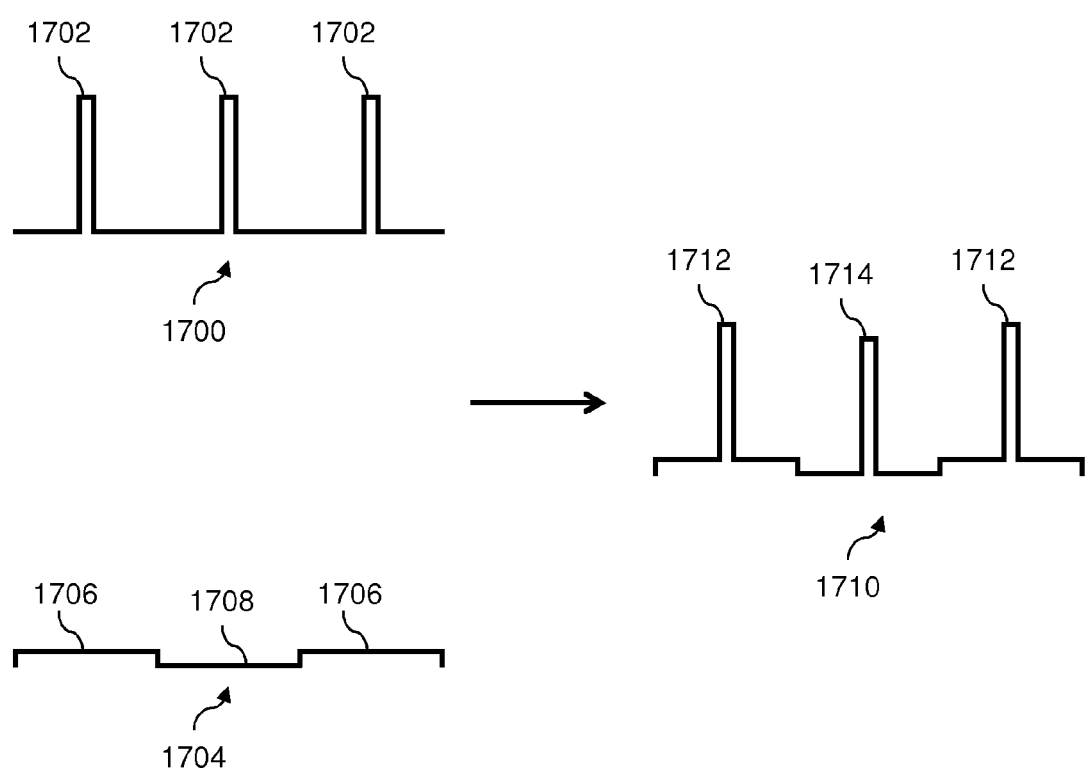
FIG. 17 is a timing diagram of a laser projector system that includes a green laser diode assembly and a green pulsed laser.

FIG. 17 shows a timing diagram of a laser projector system that includes a green laser diode assembly and a green pulsed laser. Curve 1700 represents a series of light pulses from a green pulsed laser, and curve 1704 represents a series of light pulses from a green laser diode assembly. When combined together, curve 1700 and curve 1704 form curve 1710 which represents a series of light pulses with improved bit depth. Curve 1700 has periodic unswitched pulses. Three of the pulses are shown as pulses 1702. Curve 1704 has periodic switched pulses. Two of the high pulses are shown as pulses 1706 and one of the low pulse positions is shown as pulse position 1708. Pulse position 1708 may switched on when high brightness is desired and switched off when low brightness is desired. FIG. 17 shows pulse position 1708 switched off. Curve 1710 has a combination of periodic switched and unswitched pulses. Two of the combined high and high pulses are shown as unswitched pulses 1712 and one of the combined high and low pulses is shown as combined switched and unswitched pulse 1714. Combined switched and unswitched pulse 1714 provides one additional bit of bit depth. Combined switched and unswitched pulse 1714 may have higher amplitude when high brightness is desired and lower amplitude when low brightness is desired. FIG. 17 shows combined switched and unswitched pulse 1714 in the low brightness state. Curves 1700, 1704, and 1710 may have pulses at a repetition rate of 25 kHz or curves 1700, 1704, and 1710 may have pulses at a repetition rate of 50 kHz.

Figure 18:
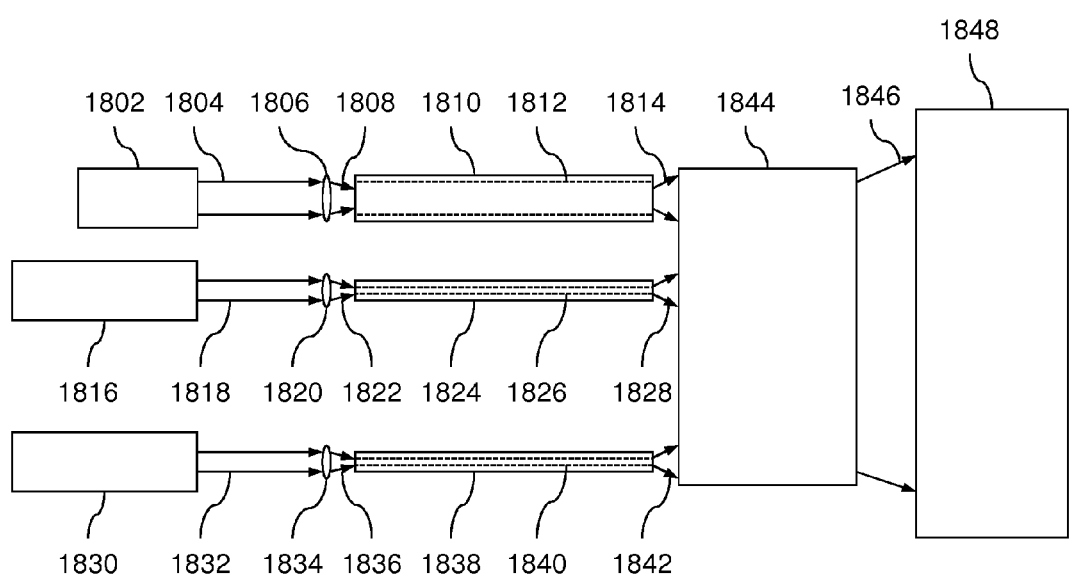
FIG. 18 is a top view of a laser projector system that includes a green laser diode assembly and two green pulsed lasers.

FIG. 18 shows a top view of a laser projector system that includes a green laser diode assembly and two green pulsed lasers. Green laser diode assembly 1802 generates first light beam 1804. First light beam 1804 illuminates first light coupling system 1806. First light coupling system 1806 generates second light beam 1808. Second light beam 1808 illuminates first optical fiber 1810 which has first core 1812. First optical fiber 1810 generates third light beam 1814. Third light beam 1814 illuminates homogenizing device 1844. First green pulsed laser 1816 generates fourth light beam 1818. Fourth light beam 1818 illuminates second light coupling system 1820. Second light coupling system 1820 generates fifth light beam 1822. Fifth light beam 1822 illuminates second optical fiber 1824 which has second core 1826. Second optical fiber 1824 generates sixth light beam 1828. Sixth light beam 1828 illuminates homogenizing device 1844. Second green pulsed laser 1830 generates seventh light beam 1832. Seventh light beam 1832 illuminates third light coupling system 1834. Third light coupling system 1834 generates eighth light beam 1836. Eighth light beam 1836 illuminates third optical fiber 1838 which has third core 1840. Third optical fiber 1838 generates ninth light beam 1842. Ninth light beam 1842 illuminates homogenizing device 1844. Homogenizing device 1844 combines third light beam 1814, sixth light beam 1828, and ninth light beam 1842 to generate tenth light beam 1846. Tenth light beam 1846 illuminates digital projector 1848.

There may be additional elements not shown in FIG. 18 which are between the parts illuminating and the parts being illuminated. For example, there may be additional lenses before homogenizing device 1844 to adjust the divergence of the light beams so that the homogenizing device operates with the proper amount of homogenization. Green laser diode assembly 1802 does not generate SRS in first optical fiber 1810. First green pulsed laser 1816 and second green pulsed laser 1830 laser have high enough peak power to produce SRS in second optical fiber 1824 and third optical fiber 1838. First green pulsed laser 1816 and second green pulsed laser 1830 may be DPSS lasers. First light coupling system 1806, second light coupling system 1820, and third light coupling system 1834 may each be one lens, a sequence of lenses, or other optical components designed to focus light into first core 1812, second core 1826, and third core 1840. Second optical fiber 1824 and third optical fiber 1838 may be optical fibers with a core sizes and lengths selected to produce the desired amount of SRS. Homogenizing device 1844 may be a mixing rod, fly's eye lens, diffuser, or other optical component that improves the spatial uniformity of the light beam. Digital projector 1848 may be a projector based on DMD light valves. First green pulsed laser 1816 and second green pulsed laser 1830 may have repetition rates significantly less than 100 kHz. For example, the repetition rate may be 25 kHz, 50 kHz, or in the range of 5 to 90 kHz. Green laser diode assembly 1802, first green pulsed laser 1816, or second green pulsed laser 1830 may be switched on and off to improve the bit depth of the image formed by digital projector 1848. Additional elements may be included to further guide or despeckle the light such as additional lenses, diffusers, vibrators, or optical fibers. Instead of homogenizing element 1844, other ways may be employed to combine the light from green laser diode assembly 1802, first green pulsed laser 1816, and second green pulsed laser 1830. Laser diode assembly 1802 may include multiple green laser diodes aggregated to increase the power and bandwidth.

Figure 19:
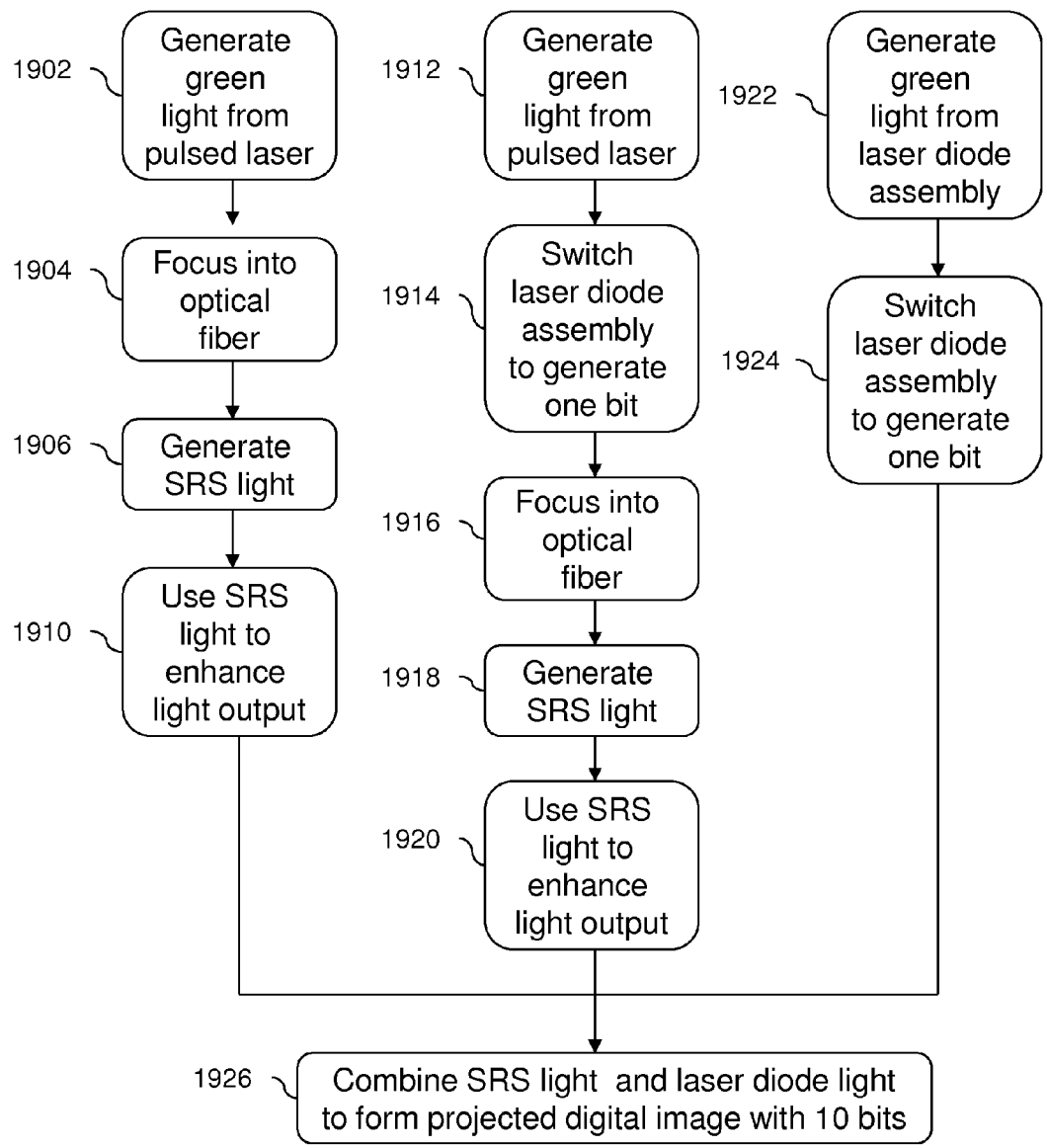
FIG. 19 is a flowchart of a method of improving bit depth with a green laser diode assembly and two green pulsed lasers.

FIG. 19 shows a flowchart of a method of improving bit depth with a green laser diode assembly and two green pulsed lasers. In step 1902, green light is generated from a pulsed laser. In step 1904, the green light from the pulsed laser is focused into an optical fiber. In step 1906, SRS light is generated in the optical fiber. In step 1910, the SRS light is used to enhance the light output from the optical fiber. In step 1912, green light is generated from a second pulsed laser. In step 1914, the green light from the second pulsed laser is switched on and off to generate one bit of bit depth. In step 1916 the green light from the second pulsed laser is focused into a second optical fiber. In step 1918, SRS light is generated in the second optical fiber. In step 1920, the SRS light is used to enhance the light output from the second optical fiber. In step 1922, green light is generated from a laser diode assembly. In step 1924 the laser diode assembly is switched on and off to generate one bit of bit depth. In step 1926, the light from the first optical fiber, the light from the second optical fiber, and the light from the laser diode assembly are combined to form a projected digital image. Enhancing the light output from the optical fiber may include reducing speckle, changing the color of the light, or changing any other optical property of the light to improve the quality of the light for the purpose of forming images. Multiple laser diodes may be aggregated in step 1922 and their light may be fiber delivered prior to combining with the light from the optical fiber in used in step 1904 and step 1916.

Figure 20:
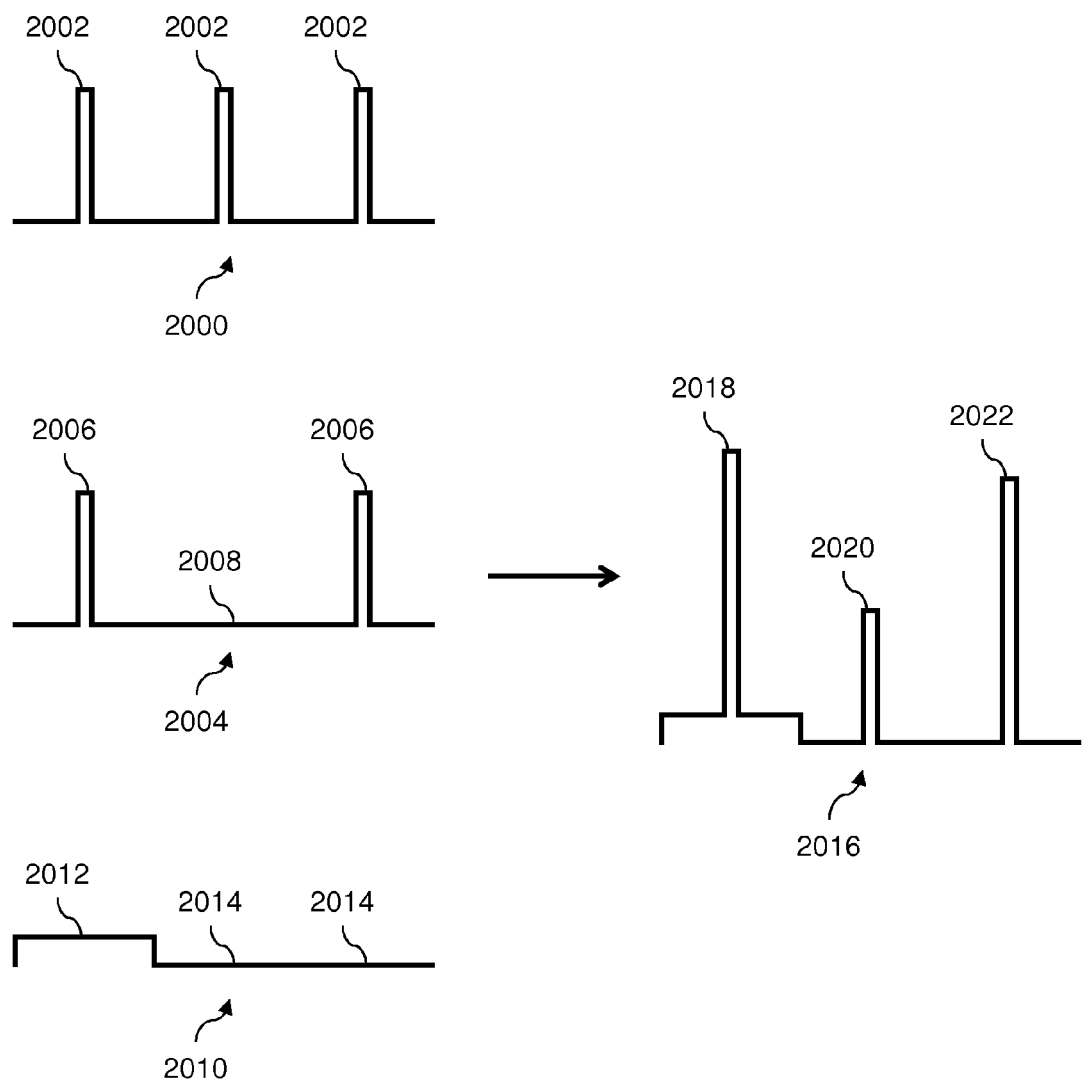
FIG. 20 is a timing diagram of a laser projector system that includes a green laser diode assembly and two green pulsed lasers.

FIG. 20 shows a timing diagram of a laser projector system that includes a green laser diode assembly and two green pulsed lasers. Curve 2000 represents a series of light pulses from a first green pulsed laser, curve 2004 represents a series of light pulses from a second green pulsed laser, and curve 2010 represents a series of light pulses from a green laser diode assembly. When combined together, curve 2000, curve 2004, and curve 2010 form curve 2016 which represents a series of light pulses with improved bit depth. Curve 2000 has periodic unswitched pulses. Three of the pulses are shown as pulses 2002. Curve 2004 has periodic switched pulses. Two of the high pulses are shown as pulses 2006 and one of the low pulse positions is shown as pulse position 2008. Pulse position 2008 may switched on when high brightness is desired and switched off when low brightness is desired. FIG. 20 shows pulse position 2008 switched off. Curve 2010 has periodic switched pulses. One of the high pulses is shown as pulse 2012 and two of the low pulse positions are shown as pulse positions 2014. Pulse positions 2014 may switched on when high brightness is desired and switched off when low brightness is desired. FIG. 20 shows pulse positions 2014 switched off. Curve 2016 has a combination of periodic switched and unswitched pulses. One of the combined high, high, and high pulses is shown as combined unswitched pulse 2018. One of the combined high, high, and low pulses is shown as combined switched and unswitched pulse 2022. One of the combined high, low, and low pulses is shown as combined switched and unswitched pulse 2020. Combined switched and unswitched pulse 2022 provides one additional bit of bit depth. Combined switched and unswitched pulse 2020 provides two additional bits of bit depth. Combined switched and unswitched pulse 2022 and combined switched and unswitched pulse 2020 may have higher amplitude when high brightness is desired and lower amplitude when low brightness is desired. FIG. 20 shows combined switched and unswitched pulse 2022 and combined switched and unswitched pulse 2020 in the low brightness states. Curves 2000, 2004, 2010, and 2016 may have pulses at a repetition rate of approximately 25 kHz to achieve 10 bits of bit depth, or curves 2000, 2004, 2010, and 2016 may have pulses at a repetition rate of approximately 50 kHz to achieve 11 bits of bit depth. If the repetition rate varies less than +/−20% from the approximate 25 and 50 kHz targets, the bit depth difference will generally be imperceptible in typical cinema applications. To achieve even higher bit depth, additional lasers may be included to add additional switched pulses (not shown in FIG. 20).

The examples above show specific combinations of green lasers and switching to achieve at least 10 bits of bit depth with lasers that operate at repetition rates of less than 100 kHz. Other combinations may be employed to achieve similar results. Red and blue light may be added as necessary to form full-color images. Improved bit depth in green may be advantageous even if the red and blue bit depth is not improved to match the green.

The term "pulsed" is used to describe pulses at a repetition frequency equal to or higher than 5 kHz. Other operation modes include continuous wave (CW) and quasi-continuous wave (QCW). CW is defined as continuously on without pulsing. QCW is defined to be pulsing operation at less than 5 kHz. In general, laser diode assemblies are used in CW or QCW operation modes and DPSS lasers are used in pulsed operation mode. The term "switched" is used to describe individual pulses being turned on or off in a fixed pattern. The DMD minors of the projector light valves are controlled by a bit sequence algorithm that synchronizes with the switched pulses to achieve improved bit depth. The switched pulses may occur with a fixed pattern and that do not depend on the content of the image. For example, in every frame, a certain number of pulses may be maximum amplitude pulses, and a certain number may be lower amplitude. If the switched pulses do depend on image content, then dynamic contrast adjustment is possible. In this case, frames with higher average picture level may have more high amplitude pulses, and frames with lower average picture level may have more low amplitude pulses.

The optimal bit depth is related to the optical contrast ratio of the projection system. 10 bits of bit depth are usually used to match the digital cinema standard of 2000:1 sequential contrast ratio as specified in the DCI standard. 11 or 12 bits of bit depth may be helpful to make full use of higher sequential contrast ratio in a high-performance projection system. For example, 11 bits can match up to 4000:1 sequential contrast ratio, and 12 bits can match up to 8000:1 sequential contrast ratio.

Pulsed green lasers may be constructed utilizing DPSS lasers with starting wavelengths at 515 nm, 523.5 nm, 532 nm or another wavelength. Stimulated Raman shift in an optical fiber may be employed to create additional green peaks that are shifted from the starting wavelengths. If the starting wavelength is 523.5 nm, and fused silica fiber is used, the stimulated Raman peaks occur at 536.6 nm, 550.4 nm, 564.9 nm, and 580.2 nm. The entire green spectrum including residual light from the starting wavelength of 523.5 nm and the Raman shifted peaks may be used as pulsed green light to illuminate a digital projection system. Green laser diode assemblies may be constructed from direct green laser diodes, or IR laser diodes that have second harmonic crystals to create green light. A multitude of laser diodes may be aggregated with minors, optical fibers, or other methods to create an assembly with sufficient power. The brightness from the laser diode assembly may be approximately matched within +/−20% or better to the light from the pulsed lasers. The power and brightness of each laser pulse is correlated with the area under the pulse. This matching is necessary so that the laser diode assembly switching will add a full bit of bit depth. In an alternate configuration, instead of switching the laser diode assembly, the pulsed laser(s) may be switched and the laser diode assembly may be unswitched.

Other implementations are also within the scope of the following claims.

What is claimed is:

1. An optical apparatus comprising:
   a laser diode assembly that generates a first green laser light;
   a first pulsed laser that generates a second green laser light; and
   a first optical fiber;
   wherein the first pulsed laser has a pulse repetition rate of less than 100 kHz; the second green laser light is focused into the first optical fiber; the first optical fiber generates a first stimulated Raman scattering light that enhances an aspect of a light output of the first optical fiber; the first green laser light and the first stimulated Raman scattering light are combined to form a projected digital image;
   and the laser diode assembly is switched to generate one bit of bit depth in the projected digital image.

2. The apparatus of claim 1 wherein the aspect of the light output of the first optical fiber is a color of the output of the optical fiber.

3. The apparatus of claim 1 wherein the aspect of the light output of the first optical fiber is a speckle characteristic of the output of the optical fiber.

4. The apparatus of claim 1 wherein the second green laser light has a wavelength of 515 nm.

5. The apparatus of claim 1 wherein the second green laser light has a wavelength of 523.5 nm.

6. The apparatus of claim 1 wherein the pulsed laser comprises a diode pumped solid state laser.

7. The apparatus of claim 1 wherein the pulse repetition rate is equal to approximately 25 kHz.

8. The apparatus of claim 7 further comprising:
   a second pulsed laser that generates a third green laser light; and
   a second optical fiber;
   wherein the third green laser light is focused into the second optical fiber; the second optical fiber generates a second stimulated Raman scattering light that enhances an aspect of a light output of the second optical fiber; the first green laser light, the first stimulated Raman scattering light, and the second stimulated Raman scattering light are combined to form a projected digital image; and the second pulsed laser is switched to generate one bit of bit depth.

9. The apparatus of claim 8 wherein a brightness of the first green laser light is approximately equal to a brightness of the second green laser light plus a brightness of the third green laser light; and the combination of the laser diode assembly, the first pulsed laser, and the second pulsed laser achieves 10 bits of bit depth in the projected digital image.

10. The apparatus of claim 8 further comprising:
a third pulsed laser that generates a fourth green laser light; and
a third optical fiber;
wherein the third pulsed laser has a pulse repetition rate equal to approximately 50 kHz; the fourth green laser light is focused into the third optical fiber; the third optical fiber generates a third stimulated Raman scattering light that enhances an aspect of a light output of the third optical fiber; the first green laser light, the first stimulated Raman scattering light, the second stimulated Raman scattering light, and third stimulated Raman scattering light are combined to form a projected digital image; a brightness of the first green laser light is approximately equal to a brightness of the second green laser light plus a brightness of the third green laser light plus a brightness of the fourth green laser light; the third pulsed laser is switched to generate one bit of bit depth; and the combination of the laser diode assembly, the first pulsed laser, the second pulsed laser, and the third pulsed laser achieves 12 bits of bit depth in the projected digital image.

11. An image projection method comprising:
generating a first green laser light from a green laser diode assembly;
generating a second green laser light from a first pulsed laser that has a pulse repetition rate of less than 100 kHz;
focusing the second green laser light into a first optical fiber;
generating a first stimulated Raman scattering light in the first optical fiber;
using the first stimulated Raman scattering light to enhance an aspect of a light output of the first optical fiber;
combining the first green laser light and the first stimulated Raman scattering light to form a projected digital image; and
switching the green laser diode assembly to generate one bit of bit depth in the projected digital image.

12. The method of claim 11 wherein the aspect of the light output of the optical fiber is a color of the output of the optical fiber.

13. The method of claim 11 wherein the aspect of the light output of the optical fiber is a speckle characteristic of the output of the optical fiber.

14. The method of claim 11 wherein the second green laser light has a wavelength of 515 nm.

15. The method of claim 11 wherein the second green laser light has a wavelength of 523.5 nm.

16. The method of claim 11 wherein the pulsed laser comprises a diode pumped solid state laser.

17. The method of claim 11 wherein the pulse repetition rate is equal to approximately 25 kHz.

18. The method of claim 17 further comprising:
generating a third green laser light from a second pulsed laser;
focusing the third green laser light into a second optical fiber;
generating a second stimulated Raman scattering light in the second optical fiber;
using the second stimulated Raman scattering light to enhance an aspect of a light output of the second optical fiber; and
combining the first green laser light, the first stimulated Raman scattering light, and the second stimulated Raman scattering light to form a projected digital image.

19. The method of claim 18 wherein a brightness of the first green laser light is approximately equal to a brightness of the second green laser light plus a brightness of the third green laser light; the second pulsed laser is switched to generate one bit of bit depth; and the combination of the laser diode assembly, the first pulsed laser, and the second pulsed laser achieves 10 bits of bit depth in the projected digital image.

20. The method of claim 19 further comprising:
generating a fourth green laser light from a third pulsed laser;
focusing the fourth green laser light into a third optical fiber;
generating a third stimulated Raman scattering light in the third optical fiber;
using the third stimulated Raman scattering light to enhance an aspect of a light output of the third optical fiber; and
combining the first green laser light, the first stimulated Raman scattering light, the second stimulated Raman scattering light, and the third stimulated Raman scattering light to form a projected digital image;
wherein the third pulsed laser has a pulse repetition rate equal to approximately 50 kHz; a brightness of the first green laser light is approximately equal to a brightness of the second green laser light plus a brightness of the third green laser light plus a brightness of the fourth green laser light; the third pulsed laser is switched to generate one bit of bit depth; and the combination of the laser diode assembly, the first pulsed laser, the second pulsed laser, and the third pulsed laser achieves 12 bits of bit depth in the projected digital image.

* * * * *